US008538137B2

(12) United States Patent
Sumitomo et al.

(10) Patent No.: US 8,538,137 B2
(45) Date of Patent: Sep. 17, 2013

(54) IMAGE PROCESSING APPARATUS, INFORMATION PROCESSING SYSTEM, AND IMAGE PROCESSING METHOD

(75) Inventors: Hironori Sumitomo, Moriguchi (JP); Yoshihisa Abe, Sakai (JP)

(73) Assignee: Konica Minolta Holdings, Inc. (JP)

( * ) Notice: Subject to any disclaimer, the term of this patent is extended or adjusted under 35 U.S.C. 154(b) by 357 days.

(21) Appl. No.: 12/844,141

(22) Filed: Jul. 27, 2010

(65) Prior Publication Data

US 2011/0026773 A1   Feb. 3, 2011

(30) Foreign Application Priority Data

Jul. 28, 2009 (JP) ................................. 2009-175062

(51) Int. Cl.
*G06K 9/00* (2006.01)
(52) U.S. Cl.
USPC ............................. 382/154; 356/12; 396/140
(58) Field of Classification Search
USPC ................. 382/100, 154, 181, 216, 190, 195, 382/209, 294; 345/419–427; 356/12; 348/14.16; 396/140, 149
See application file for complete search history.

(56) References Cited

U.S. PATENT DOCUMENTS

| 6,011,581 | A * | 1/2000 | Swift et al. ...................... 348/58 |
| 6,493,465 | B2 * | 12/2002 | Mori et al. ...................... 382/209 |
| 6,763,125 | B2 * | 7/2004 | Ohta ............................ 382/104 |
| 7,512,262 | B2 * | 3/2009 | Criminisi et al. ............. 382/154 |
| 7,991,228 | B2 * | 8/2011 | Blake et al. ................... 382/173 |
| 8,009,897 | B2 * | 8/2011 | Xu et al. ....................... 382/154 |
| 2007/0009150 | A1 * | 1/2007 | Suwa et al. .................... 382/154 |
| 2009/0304266 | A1 | 12/2009 | Aoki et al. .................... 382/154 |

FOREIGN PATENT DOCUMENTS

| JP | 2008-123141 A | 5/2008 |
| JP | 2008-157780 A | 7/2008 |

OTHER PUBLICATIONS

Kenji Takita et al., "A Sub-Pixel Correspondence Search Technique for Computer Vision Applications", IEICE Trans. Fundamentals, vol. E87-A, No. 8, Aug. 2004, pp. 1913-1923.

* cited by examiner

*Primary Examiner* — Anand Bhatnagar
(74) *Attorney, Agent, or Firm* — Cantor Colburn LLP

(57) ABSTRACT

A technique is provided which can improve the precision of a matching point search with a plurality of images taking the same object where distant and near views coexist. A plurality of first images obtained by time-sequentially imaging an object from a first viewpoint, and a plurality of second images obtained by time-sequentially imaging the object from a second viewpoint, are obtained. Reference regions including a reference point are set respectively in the first images with the same arrangement, and comparison regions corresponding to the form of the reference regions are set respectively in the second images with the same arrangement. One reference distribution of pixel values about two-or-more-dimensional space is generated from the distributions of pixel values about the plurality of reference regions, and one comparison distribution of pixel values about two-or-more-dimensional space is generated from the distributions of pixel values about the plurality of comparison regions. Then, a matching point in the plurality of second images that corresponds to the reference point is detected by using the reference distribution of pixel values and the comparison distribution of pixel values.

13 Claims, 28 Drawing Sheets

F I G. 1
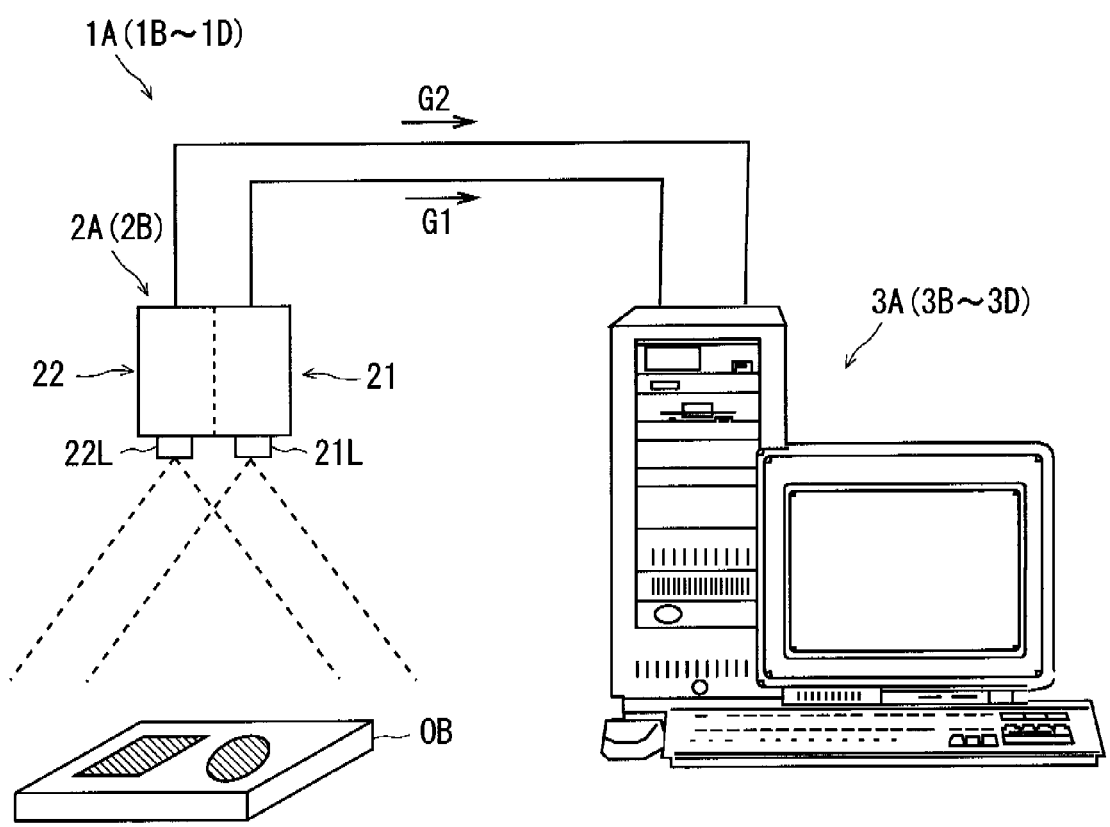

F I G . 3 4
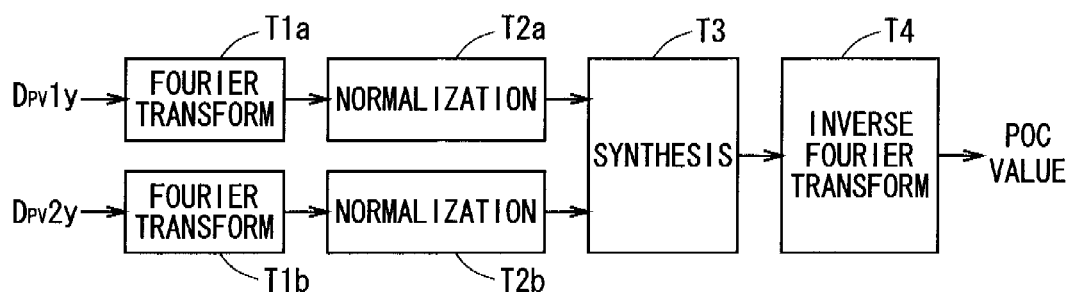
F I G . 3 5
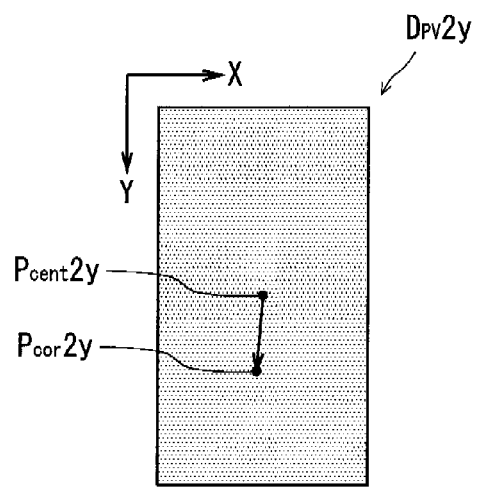

F I G. 4 3
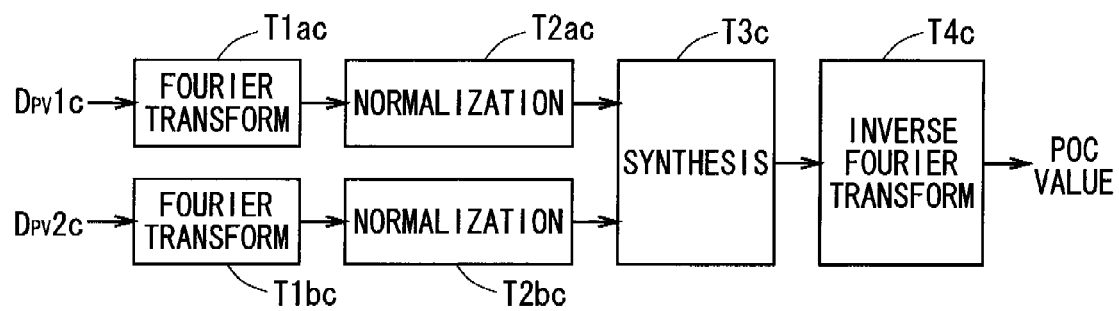
F I G. 4 4
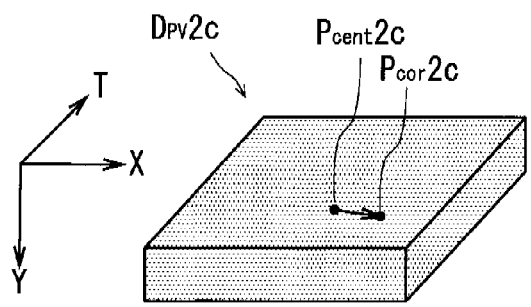

F I G. 4 5
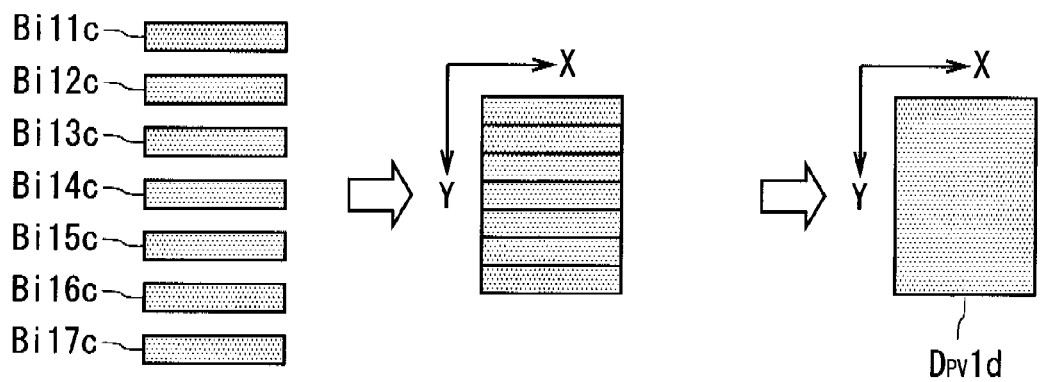
F I G. 4 6
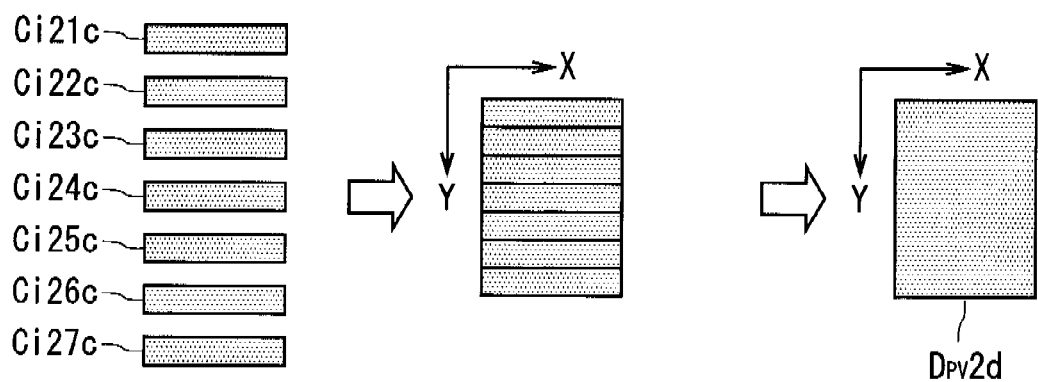

IMAGE PROCESSING APPARATUS, INFORMATION PROCESSING SYSTEM, AND IMAGE PROCESSING METHOD

This application is based on application No. 2009-175062 filed in Japan, the contents of which are hereby incorporated by reference.

BACKGROUND OF THE INVENTION

1. Field of the Invention

The present invention relate to image processing techniques.

2. Description of the Background Art

Conventionally, techniques (matching point search techniques) are known in which two images are obtained by imaging the same object from different viewpoints with a so-called stereo camera and individual pixels in the two images are mutually correlated by comparison of two-dimensional image regions, e.g. by template matching.

In such matching point search techniques using two-dimensional image regions, one image is processed as a reference (reference image) and the other image is processed as a target (target image), for example. In such a matching point search technique, first, a window region is set in the reference image such that a point of interest in the reference image is approximately the gravity center position, and a window region of the same size is set in the target image such that a point to be processed in the target image is approximately the gravity center position. Then, the correlation between the two window regions is evaluated to match pixels between the reference and target images (for example, "A Sub-Pixel Correspondence Search Technique for Computer Vision Applications", Kenji TAKITA, Mohammad abdul MUQUIT, Takafumi AOKI, and Tatsuo HIGUCHI, IEICE TRANS. FUNDAMENTALS, VOL E87-A, NO. 8 Aug. 2004, which is hereinafter referred to as Non-Patent Document 1).

Also, for such matching point search techniques, a technique is proposed in which the amount of computations required for the search of a matching point is considerably reduced and the results of matching are obtained very precisely and in short time (for example, Japanese Patent Application Laid-Open No. 2008-123141, which is hereinafter referred to as Patent Document 1). In this technique, the shape of window regions is one-dimensional. Also, a technique is proposed in which influences of noise are reduced and the three-dimensional position of an object can be very precisely measured (for example, Japanese Patent Application Laid-Open No. 208-157780, which is hereinafter referred to as Patent Document 2). In this technique, a matching point search is performed with integral images obtained by integrating individual pixels in time-sequentially taken multiple images.

In such matching point search techniques, the parallax about individual pixels between the reference image and target image is approximately uniform when the distance to the object taken in the two window regions set in the reference and target images is approximately uniform on the basis of the stereo camera, and then the matching point search offers precise results. Also, the amount of information used for the matching point search can be increased by increasing the size of window regions, and then the precision of the matching point search is ensured.

However, in the technique of Non-Patent Document 1, when the reference image and target image include a mixture of distant and near objects (distant-near competing condition), increasing the size of the window regions to ensure precise matching point search will deteriorate the precision of the matching point search.

Also, in the technique of Patent Document 1, while the size of window regions is reduced by adopting one-dimensional window regions, matching points are searched for by statistical processing using the results of evaluation over adjacent multiple lines, in order to ensure the amount of information. Accordingly, the precision of the matching point search might be deteriorated due to the distant-near competing condition.

The technique of Patent Document 2 gives no consideration at all to measures against the distant-near competing condition in matching point search.

SUMMARY OF THE INVENTION

The present invention is directed to an image processing apparatus.

According to the present invention, the image processing apparatus includes: an image obtaining portion that obtains a plurality of first images and a plurality of second images, the plurality of first images being obtained by time-sequentially imaging an object from a first viewpoint, the plurality of second images being obtained by time-sequentially imaging the object from a second viewpoint that is different from the first viewpoint; a region setting portion that sets reference regions including a reference point respectively in the first images with a same arrangement, and that sets comparison regions corresponding to a form of the reference regions respectively in the second images with a same arrangement; a pixel value distribution generating portion that generates one reference distribution of pixel values about two-or-more-dimensional space from distributions of pixel values about the plurality of reference regions set respectively in the plurality of first images by the region setting portion, and that generates one comparison distribution of pixel values about two-or-more-dimensional space from distributions of pixel values about the plurality of comparison regions set respectively in the plurality of second images by the region setting portion; and a matching point detecting portion that detects a matching point in the plurality of second images that corresponds to the reference point, by using the reference distribution of pixel values and the comparison distribution of pixel values.

This makes it possible to ensure an amount of information used in the calculations for the matching point search while suppressing the size of image regions in the respective images used in the calculations for the matching point search, which makes it possible to improve the precision of a matching point search with a plurality of images taking the same object where distant and near views coexist.

According to another aspect of the present invention, the image processing apparatus includes: an image obtaining portion that obtains a plurality of first images and a plurality of second images, the plurality of first images being obtained by time-sequentially imaging an object from a first viewpoint, the plurality of second images being obtained by time-sequentially imaging the object from a second viewpoint that is shifted from the first viewpoint in both of a first direction and a second direction; a first image generating portion that generates a plurality of first parallax suppressed images by suppressing parallax about the second direction occurring in each first image, and that generates a plurality of second parallax suppressed images by suppressing parallax about the second direction occurring in each second image; a second image generating portion that generates a plurality of third parallax suppressed images by suppressing parallax about the first direction occurring in each first image, and that generates a plurality of fourth parallax suppressed images by suppressing parallax about the first direction occurring in each second image; a first region setting portion that sets first reference regions that include a first reference point and that have an elongate direction corresponding to the first direction respectively in the first parallax suppressed images with a same arrangement, and also sets first comparison regions corresponding to a form of the first reference regions respectively in the second parallax suppressed images with a same arrangement; a second region setting portion that sets second reference regions that include a second reference point corresponding to the first reference point and that have an elongate direction corresponding to the second direction respectively in the third parallax suppressed images with a same arrangement, and also sets second comparison regions corresponding to a form of the second reference regions respectively in the fourth parallax suppressed images with a same arrangement; a first pixel value distribution generating portion that generates one first reference distribution of pixel values about two-or-more-dimensional space from distributions of pixel values about the plurality of first reference regions that are set respectively in the plurality of first parallax suppressed images by the first region setting portion, and also generates one first comparison distribution of pixel values about two-or-more-dimensional space from distributions of pixel values about the plurality of first comparison regions that are set respectively in the plurality of second parallax suppressed images by the first region setting portion; a second pixel value distribution generating portion that generates one second reference distribution of pixel values about two-or-more-dimensional space from distributions of pixel values about the plurality of second reference regions that are set respectively in the plurality of third parallax suppressed images by the second region setting portion, and also generates one second comparison distribution of pixel values about two-or-more-dimensional space from distributions of pixel values about the plurality of second comparison regions that are set respectively in the plurality of fourth parallax suppressed images by the second region setting portion; a first obtaining portion that, by using the first reference distribution of pixel values and the first comparison distribution of pixel values, obtains a first matching point in the plurality of second parallax suppressed images that corresponds to the first reference point, and a first reliability about the first matching point; a second obtaining portion that, by using the second reference distribution of pixel values and the second comparison distribution of pixel values, obtains a second matching point in the plurality of fourth parallax suppressed images that corresponds to the second reference point, and a second reliability about the second matching point; and a matching point detecting portion that, with a first combination of the first reference point and the first matching point and a second combination of the second reference point and the second matching point, adopts the first combination when the first reliability is higher than the second reliability, and adopts the second combination when the second reliability is higher than the first reliability.

This makes it possible to perform a matching point search on the basis of image regions where distant and near views coexist further less, making it possible to further improve the precision of a matching point search with a plurality of images taking the same object where distant and near views coexist.

The present invention is also directed to an image processing method and an information processing system.

The information processing system includes: an image processing apparatus according to any of the aspects described above; an imaging device having a first camera and a second camera, wherein the first camera and the second camera time-sequentially take images with same timing, so that the first camera time-sequentially takes the plurality of first images and the second camera time-sequentially takes the plurality of second images; and a projection device that projects different patterns to the object according to each timing of imaging by the first camera and the second camera.

Then, it is possible to take a plurality of images while time-sequentially projecting different patterns to the object. The amount of information used in the calculations for the matching point search is further increased, and it is possible to more stably and more precisely perform a matching point search with a plurality of images taking the same object where distant and near views coexist.

Thus, an object of the present invention is to provide a technique that can improve the precision of a matching point search with a plurality of images taking the same object where distant and near views coexist.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram schematically illustrating the configuration of information processing systems according to first and second preferred embodiments and first and second modifications;

FIG. 34 is a diagram illustrating a matching point search in the second preferred embodiment;

FIG. 35 is a diagram illustrating how a matching point is derived in the second preferred embodiment;

FIG. 43 is a diagram illustrating a matching point search in the first modification;

FIG. 44 is a diagram illustrating how a matching point is detected in the first modification;

FIG. 45 is a diagram for illustrating a method of generating a reference distribution in the second modification;

FIG. 46 is a diagram for illustrating a method of generating a comparison distribution in the second modification;

DESCRIPTION OF THE PREFERRED EMBODIMENTS

Figure 2:
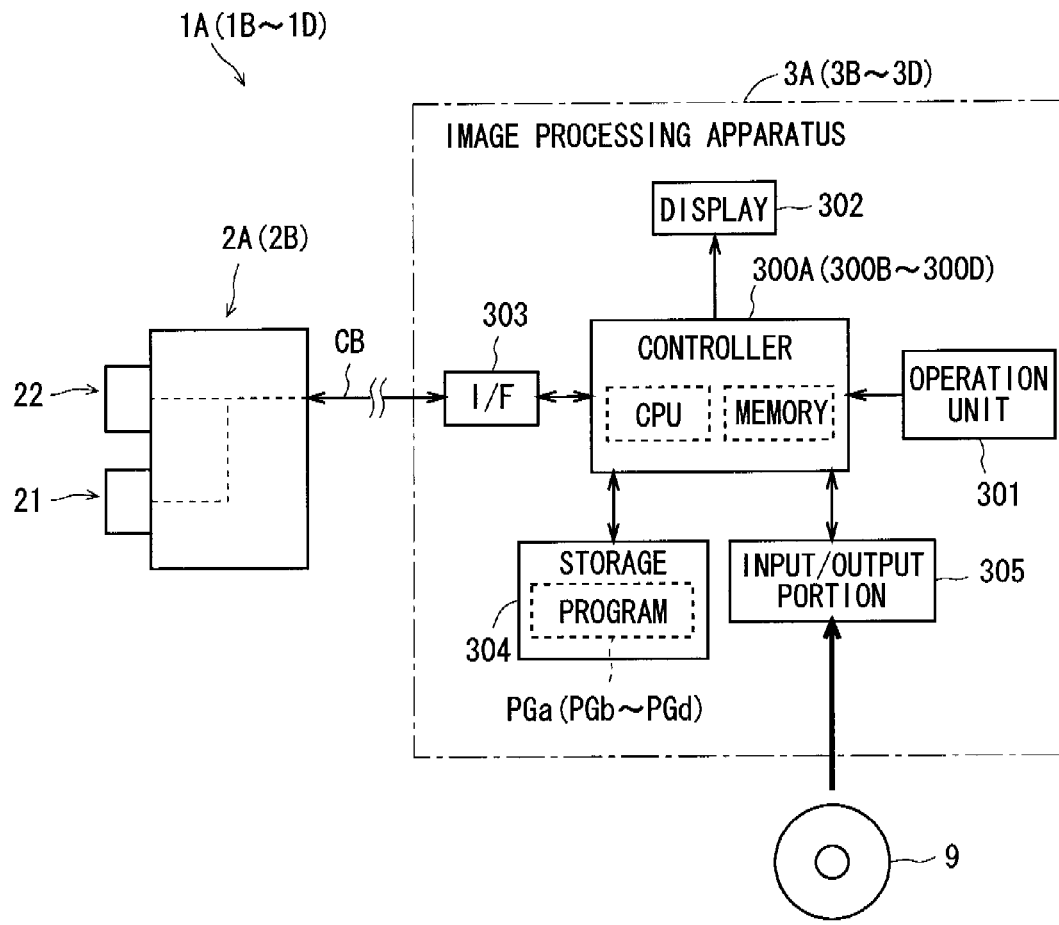
FIG. 2 is a block diagram illustrating the configuration of a main part of the information processing systems according to the first and second preferred embodiments and the first and second modifications.

The preferred embodiments of the present invention will now be described referring to the drawings.

<(1) First Preferred Embodiment>

<(1-1) Configuration of Information Processing System>

FIG. 1 is a diagram schematically illustrating the configuration of an information processing system 1A according to a first preferred embodiment of the present invention, and FIG. 2 is a block diagram illustrating the configuration of a main part of the information processing system 1A. The information processing system 1A includes a twin-lens stereo camera 2A and an image processing apparatus 3A that is connected to the stereo camera 2A such that data can be transferred.

Figure 3:
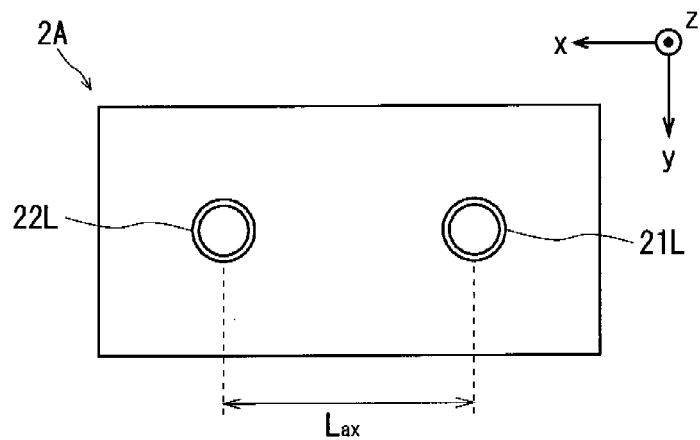
FIG. 3 is a schematic diagram illustrating an example of the configuration of a stereo camera according to the first preferred embodiment and first to third modifications.

The twin-lens stereo camera 2A is an imaging device including first and second cameras 21 and 22 having respective imaging elements. The first and second cameras 21 and 22 are separated in a given direction (in X direction here). Specifically, as shown in FIG. 3, the distance between the optical axis of the imaging lens 21L of the first camera 21 and the optical axis of the imaging lens 22L of the second camera 22 (i.e. the base length) is set as a distance $L_{ax}$ in x direction. FIG. 3 shows perpendicular three x, y and z axes in order to show the three-dimensional position of the object OB.

The first and second cameras 21 and 22 take images of the object OB, standing still in front of the camera, with the same timing and from different viewpoints. The object OB can be a metal product that is set at a relatively short distance from the stereo camera 2A, for example. Two images taken at the same timing by the first and second cameras 21 and 22 are so-called stereo images, and they are referred to as "a set of images" as appropriate.

Herein, in the two images forming such stereo images, an image taken and acquired by the first camera 21 is referred to as "a first image" as appropriate, and an image taken and acquired by the second camera 22 is referred to as "a second image" as appropriate. Also, the viewpoint of the imaging by the first camera 21 is referred to as "a first viewpoint", and the viewpoint of the imaging by the second camera 22 is referred to as "a second viewpoint" as appropriate.

With such a twin-lens stereo camera 2A, the imaging timings of the first and second cameras 21 and 22 are synchronized, and images are taken in a time-sequential manner to obtain multiple sets of images. That is to say, a first image group G1 including a plurality of first images is obtained by the first camera 21, and a second image group G2 including a plurality of second images is obtained by the second camera 22. Then, the data about the multiple sets of images is transferred to the image processing apparatus 3A through a data line CB.

The image processing apparatus 3A is formed of a personal computer (PC), for example, and it includes an operation unit 301 including a mouse, keyboard, etc., a display 302 formed of a liquid-crystal display, for example, and an interface (I/F) 303 for receiving data from the stereo camera 2A. The image processing apparatus 3A also includes a storage 304, an input/output portion 305, and a controller 300A.

The storage 304 is formed of a hard disk, for example, and it stores a program PGa for performing matching point search processing, arrangement change detecting processing, and distance measuring processing that will be described later.

The input/output portion 305 includes a disk drive, for example, and it accepts a storage medium 9 like an optical disk and exchange data with the controller 300A.

The controller 300A has a CPU serving as a processor and a memory for temporarily storing information, and it controls the components of the image processing apparatus 3A in a centralized manner. In the controller 300A, the program PGa in the storage 304 is read and executed to implement various functions and information processing operations.

Specifically, the controller 300A performs an operation of searching for matching points between first images and second images that form stereo images obtained by the stereo camera 2A (matching point search processing). Also, the controller 300A performs an operation of detecting that the relative arrangement of the first and second cameras 21 and 22 has changed (arrangement change detecting processing). Also, the controller 300A performs an operation of measuring the distance from the stereo camera 2A to the object OB by calculating the three-dimensional position of the object OB by utilizing the results of the matching point search processing (distance measuring processing). The matching point search processing, arrangement change detecting processing, and distance measuring processing will be further described later.

The program data stored in the storage medium 9 can be stored in the memory of the controller 300A through the input/output portion 305. The stored program can thus be reflected to the operations of the image processing apparatus 3A.

By the control of the controller 300A, and as the arrangement change detecting processing detects a change of the relative arrangement of the first and second cameras 21 and 22, the display 302 visually outputs a display element indicating that an adjustment operation (calibration) for the change of relative arrangement should be performed. The display 302 may visually output the results of the distance measuring processing, and may visually output a three-dimensional image of the object OB on the basis of the three-dimensional position of the object OB calculated in the distance measuring processing.

In this preferred embodiment, for the sake of clarity of explanation, the aberration of the stereo camera 2A is favorably corrected, and the first and second cameras 21 and 22 are set approximately parallel (preferably, completely parallel). That is to say, the optical axes of the first and second cameras 21 and 22 are set approximately parallel (preferably, completely parallel), and the object imaged in the first and second images have approximately the same angular relations with respect to the perimeters of the first and second images (preferably, completely the same angular relations). If the actual configuration of the stereo camera 2A is not in such a condition, the images may be transformed by image processing to stereo images taken under equivalent conditions.

<(1-2) Functions of Image Processing Apparatus>

In the image processing apparatus 3A, first images are handled as reference images, and second images are handled as target images, and it performs the matching point search processing of detecting matching points on the target images that correspond to reference points sequentially set on the reference images.

In the matching point search processing, mainly by the following operations (1) to (3), an amount of information utilized in the calculations for matching point search is ensured while reducing the size of image regions used in the calculations for matching point search. This improves the precision of the matching point search for a plurality of images taking the same object where distant and near views coexist.

(1) Small windows are set respectively in multiple reference images that form a time-sequentially obtained first image group (hereinafter also referred to as "a reference image group") G1, and the distributions of pixel values of the small windows are integrated to artificially generate a distribution of pixel values about a window larger than the small windows (hereinafter referred to as "a reference distribution").

(2) Small windows are set respectively in multiple target images that form a time-sequentially obtained second image group (hereinafter also referred to as "a target image group") G2, and the distributions of pixel values of the small windows are integrated to artificially generate a distribution of pixel values about a window larger than the small windows (hereinafter referred to as "a comparison distribution").

(3) A matching point on the target images corresponding to a reference point is detected from the reference distribution and comparison distribution.

Now, the functional configuration for the matching point search processing, arrangement change detecting processing, and distance measuring processing by the image processing apparatus 3A will be described.

Figure 4:
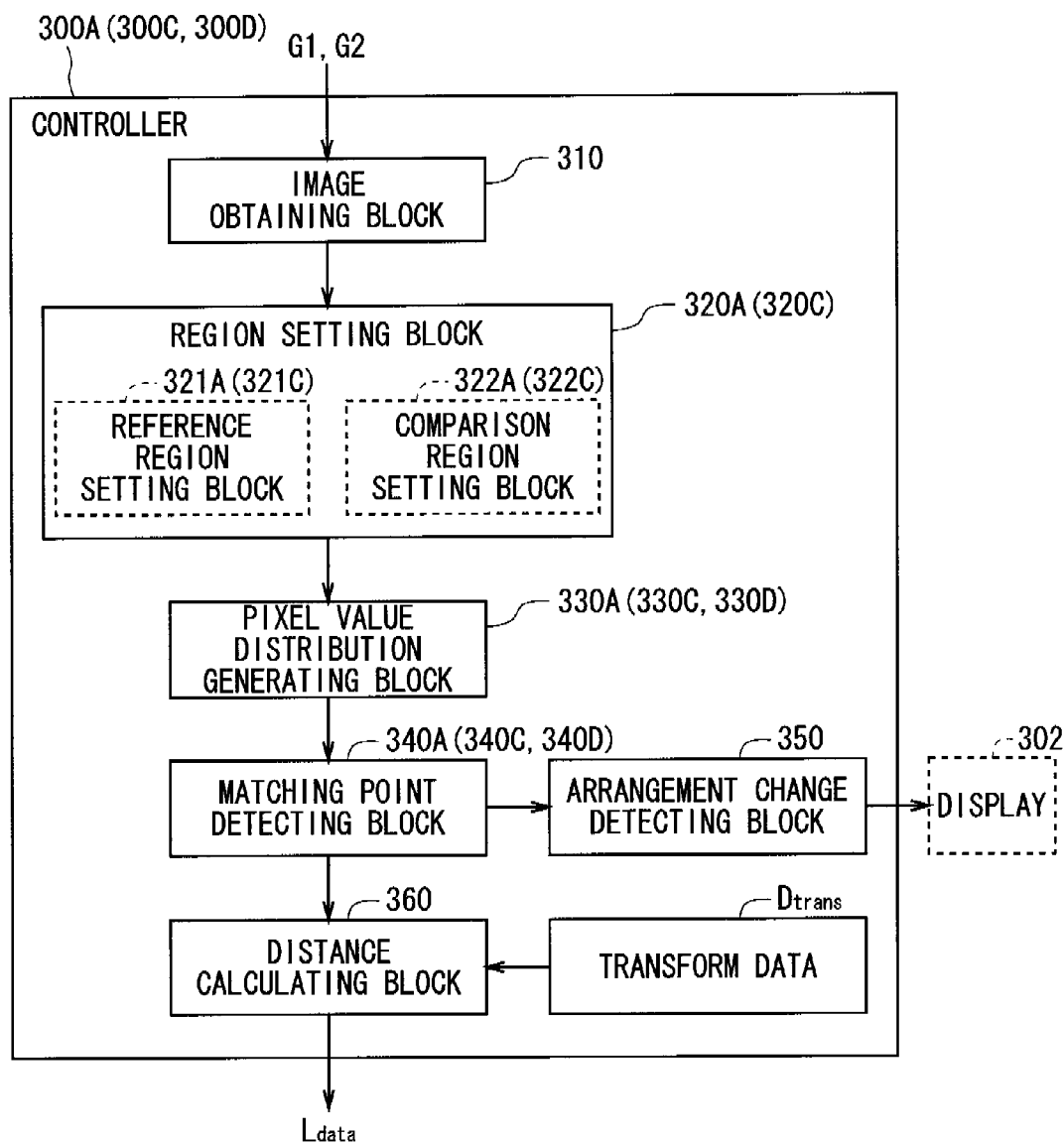
FIG. 4 is a block diagram illustrating the functional parts implemented by the controllers of the image processing apparatuses according to the first preferred embodiment and the first to third modifications.

FIG. 4 is a block diagram illustrating the functional configuration implemented by the controller 300A of the image processing apparatus 3A. As shown in FIG. 4, as the functional configuration, the controller 300A includes an image obtaining block 310, a region setting block 320A, a pixel value distribution generating block 330A, a matching point detecting block 340A, an arrangement change detecting block 350, and a distance deriving block 360. The functional configuration will be described below.

<(1-2-1) Image Obtaining Block 310>

The image obtaining block 310 obtains a reference image group G1 obtained by time-sequentially imaging the object OB from the first viewpoint with the first camera 21, and a target image group G2 obtained by time-sequentially imaging the object OB from the second viewpoint with the second camera 22. Seen from another aspect, the image obtaining block 310 obtains a plurality of image sets that are time-sequentially taken with the stereo camera 2A. Each set of images includes a reference image and a target image in which the object OB is imaged from different viewpoints.

Figure 5:
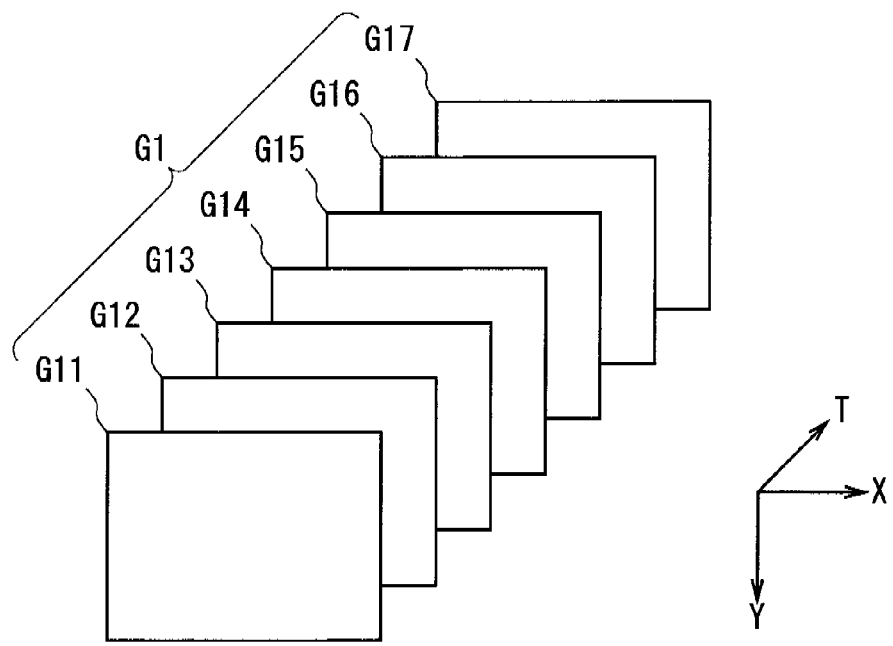
FIG. 5 is a schematic diagram illustrating a specific example of a reference image group.

FIG. 5 is a diagram illustrating a specific example of the first image group (reference image group) G1. As shown in FIG. 5, the reference image group G1 is formed of time-sequentially taken reference images G11 to G17. Each of the reference images G11 to G17 is formed of a large number of pixels arranged in a matrix along mutually perpendicular X direction and Y direction, and each of the reference images G11 to G17 has the same rectangular form. In each of the reference images G11 to G17, it is assumed that a given number (N) of pixels are arranged along X direction to form longer sides, and a given number (M) of pixels are arranged along Y direction, different from X direction, to form shorter sides.

In the reference images G11 to G17, the upper left pixel is handled as a reference (e.g. the origin) and the positions of the individual pixels are represented by the XY coordinates (X, Y), where, for example, the value of X coordinate increases by one as the position is shifted one pixel in X direction, and the value of Y coordinate increases by one as the position is shifted one pixel in Y direction.

FIG. 5 also shows coordinate axes indicating the perpendicular X and Y directions. The direction of X axis, of the two axes X and Y about two-dimensional images, corresponds to the direction of x axis, of the three axes x, y and z indicating the three-dimensional position of the object OB, and the direction of Y axis about two-dimensional images corresponds to the direction of y axis indicating the three-dimensional position of the object OB.

Figure 6:
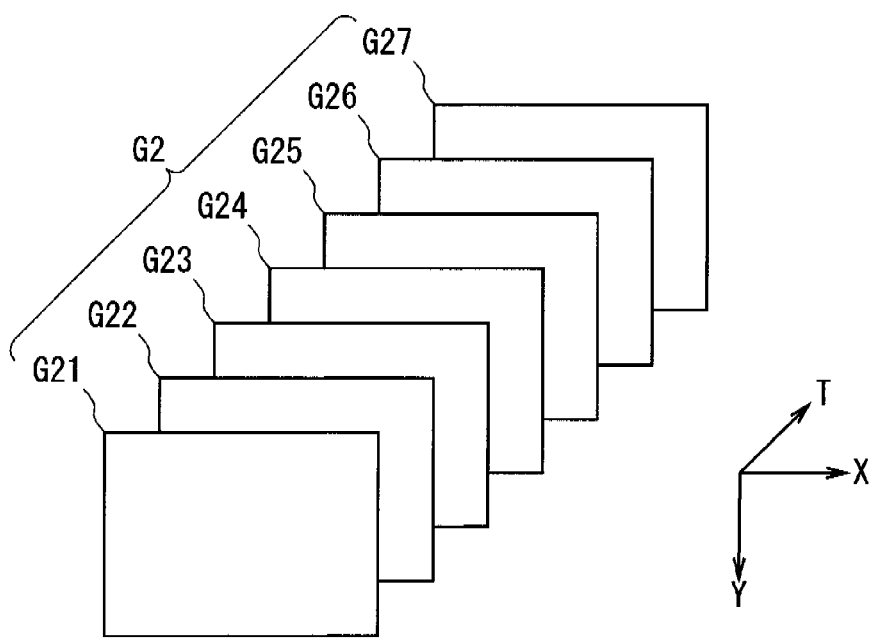
FIG. 6 is a schematic diagram illustrating a specific example of a target image group.

Also, in FIG. 5, the reference images G11 to G17 are arranged in the order of times when they were taken, and the time is indicated by the coordinate axis T. In FIG. 6 and other drawings, too, the perpendicular three axes formed of the coordinate axes X, Y and T are shown as needed.

FIG. 6 is a diagram illustrating a specific example of the second image group (target image group) G2. As shown in FIG. 6, the target image group G2 includes time-sequentially taken target images G21 to G27. The target images G21 to G27 have the same form, the same pixel arrangement, and the same pixel coordinate representation, as the reference images G11 to G17.

<(1-2-2) Region Setting Block 320A>

The region setting block 320A has a reference region setting block 321A and a comparison region setting block 322A. The reference region setting block 321A sets reference regions, as one-dimensional windows, in the individual reference images G11 to G17. The comparison region setting block 322A sets comparison regions, as one-dimensional windows, in the individual target images G21 to G27.

Figure 7:
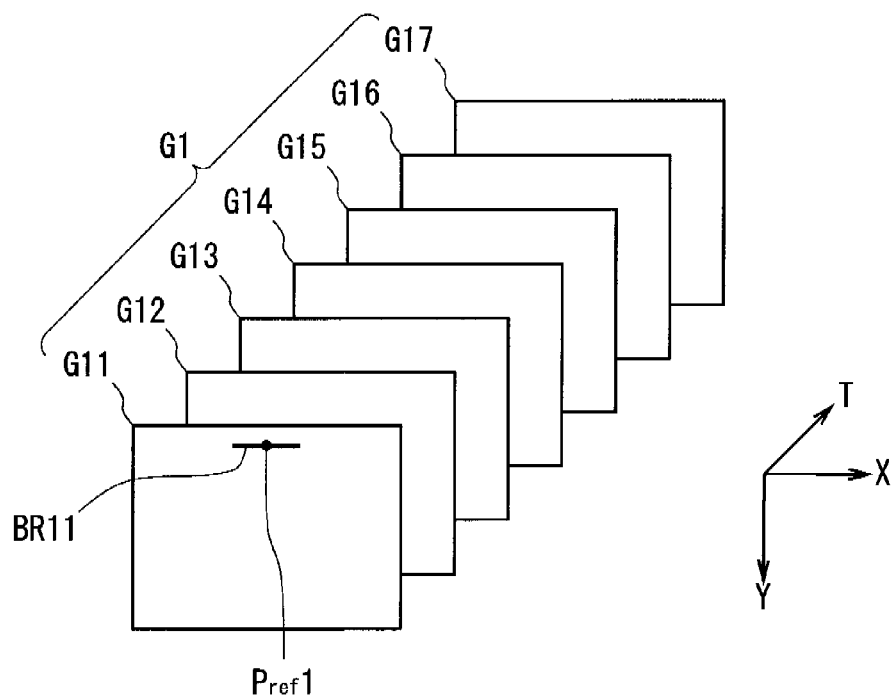
FIG. 7 is a schematic diagram illustrating how a reference region is set in a reference image.
Figure 8:
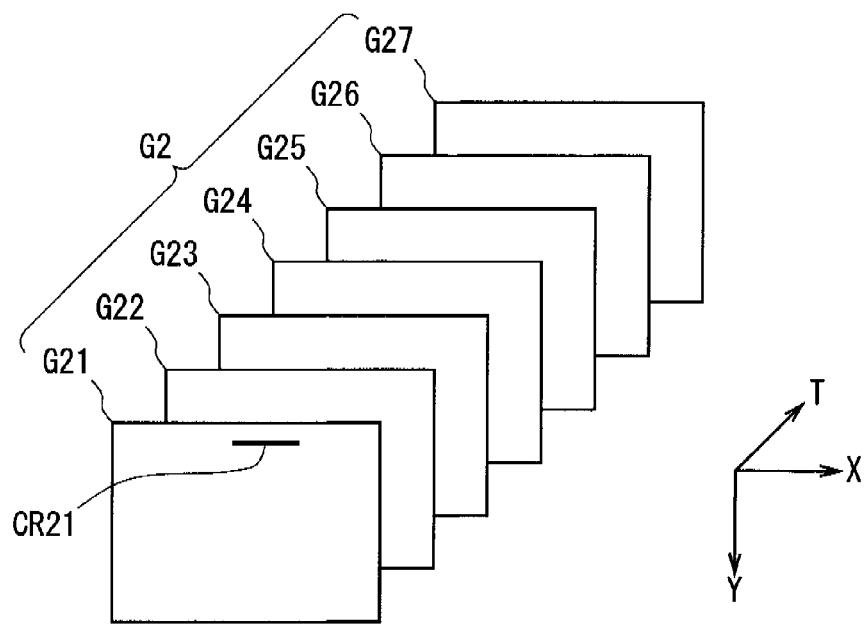
FIG. 8 is a schematic diagram illustrating how a comparison region is set in a target image.

Specifically, as shown in FIG. 7, a one-dimensional reference region BR11 that includes a reference point $P_{ref}1$ as a center point and that is formed of a pixel string along X direction is set in the reference image G11. Also, as shown in FIG. 8, a one-dimensional comparison region CR21 formed of a pixel string along X direction is set in the target image G21.

The reference region BR11 and the comparison region CR21 have a corresponding form and size (the same form and size), and the position where the reference region BR11 is set in the reference image G11 and the position where the comparison region CR21 is set in the target image G21 have a positional relation that is shifted in X direction by an amount corresponding to the base length L.

In this way, in the first image set included in the multiple image sets, the region setting block 320A sets the reference region BR11 including the reference point $P_{ref}1$ in the reference image G11 included in the first image set, and also sets the comparison region CR21 in the target image G21 included in that first image set.

Figure 9:
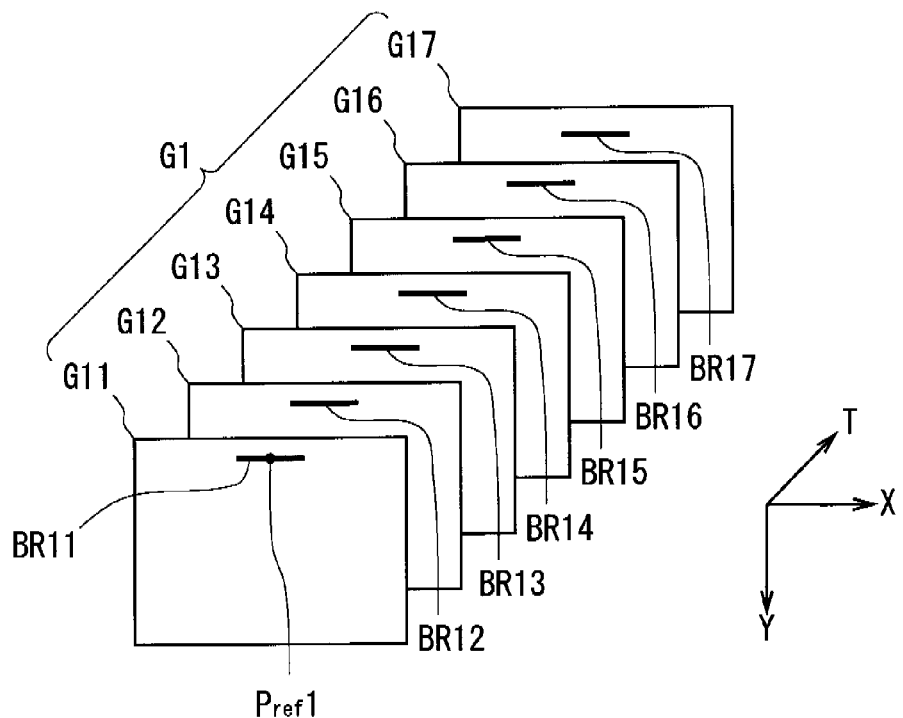
FIG. 9 is a schematic diagram illustrating how reference regions are set in the reference image group.
Figure 10:
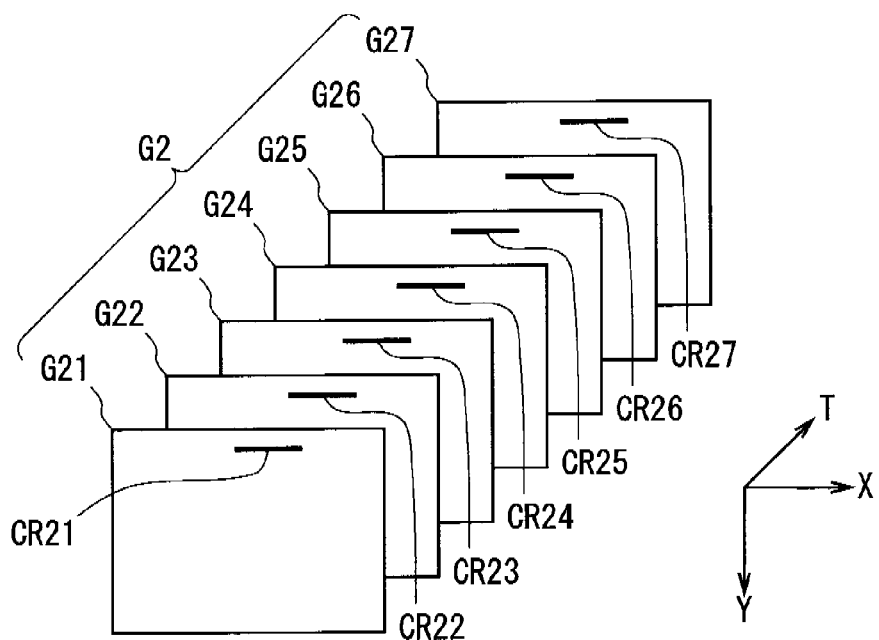
FIG. 10 is a schematic diagram illustrating how comparison regions are set in the target image group.

Also, as shown in FIG. 9, reference regions BR12 to BR17 are set respectively in the reference images G12 to G17, and, as shown in FIG. 10, comparison regions CR22 to CR27 are set respectively in the target images G22 to G27.

Here, the reference regions BR12 to BR17 have the same form and size as the reference region BR11, and the positional relation of the reference region BR11 with respect to the reference image G11, and the positional relation of the reference regions BR12 to BR17 with respect to the reference images G12 to G17, are the same. Also, the comparison regions CR22 to CR27 have the same form and size as the comparison region CR21, and the positional relation of the comparison region CR21 with respect to the target image G21, and the positional relation of the comparison regions CR22 to CR27 with respect to the target images G22 to G27, have the same positional relation.

In this way, the region setting block 320A sets the reference regions BR11 to BR17 including the reference point $P_{ref}1$ in the reference images G11 to G17 with the same arrangement, and also sets the comparison regions CR21 to CR27, corresponding to the form and size of the reference regions BR11 to BR17, in the target images G21 to G27 with the same arrangement.

Here, according to the condition of arrangement of the first viewpoint and the second viewpoint separated in x direction, the elongate direction of the multiple reference regions BR11 to BR17 and the multiple comparison regions CR21 to CR27 is set in X direction corresponding to x direction.

<(1-2-3) Pixel Value Distribution Generating Block 330A>

The pixel value distribution generating block 330A generates one distribution of pixel values about two-dimensional space (a reference distribution) from the distributions of pixel values about the plurality of reference regions BR11 to BR17, and also generates one distribution of pixel values about two-dimensional space (a comparison distribution) from the distributions of pixel values about the plurality of comparison regions CR21 to CR27.

Figure 11:
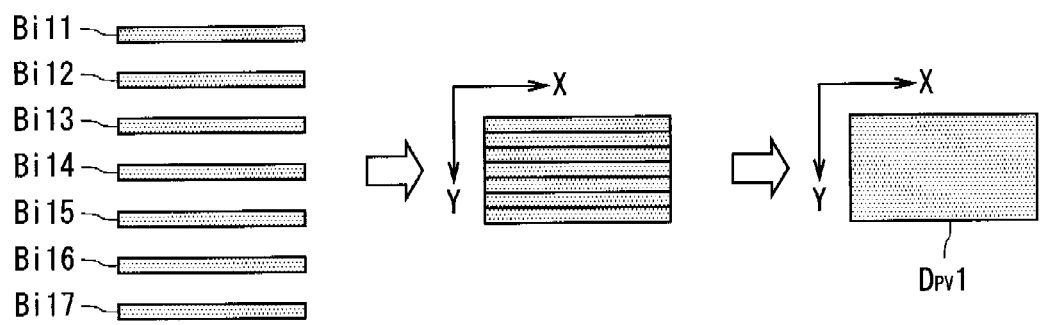
FIG. 11 is a diagram illustrating a method of generating a reference distribution of pixel values.

Specifically, as shown in FIG. 11, first, pixel strings Bi11 to Bi17 about the reference regions BR11 to BR17 are extracted from the reference images G11 to G17. Here, the pixel strings Bi11 to Bi17 indicate the distributions of pixel values about the reference regions BR11 to BR17 (hereinafter also referred to as "pixel value distributions"). More specifically, the pixel value distribution Bi11 about the reference region BR11 is extracted from the reference image G11, the pixel value distribution Bi12 about the reference region BR12 is extracted from the reference image G12, the pixel value distribution Bi13 about the reference region BR13 is extracted from the reference image G13, the pixel value distribution Bi14 about the reference region BR14 is extracted from the reference image G14, the pixel value distribution Bi15 about the reference region BR15 is extracted from the reference image G15, the pixel value distribution Bi16 about the reference region BR16 is extracted from the reference image G16, and the pixel value distribution Bi17 about the reference region BR17 is extracted from the reference image G17.

Next, the pixel value distributions Bi11 to Bi17 are arranged according to given arrangement rules to generate a two-dimensional pixel value distribution (hereinafter also referred to as "a reference distribution") $D_{PV}1$. Here, the given arrangement rules are, for example, that the pixel value distributions Bi11 to Bi17 are arranged parallel to each other, and that the pixel value distribution Bi11, pixel value distribution Bi12, pixel value distribution Bi13, pixel value distribution Bi14, pixel value distribution Bi15, pixel value distribution Bi16, and pixel value distribution Bi17 are arranged in this order and integrated, so as to form a pixel value distribution about a rectangular region. The rectangular reference distribution $D_{PV}1$ is thus generated.

Figure 12:
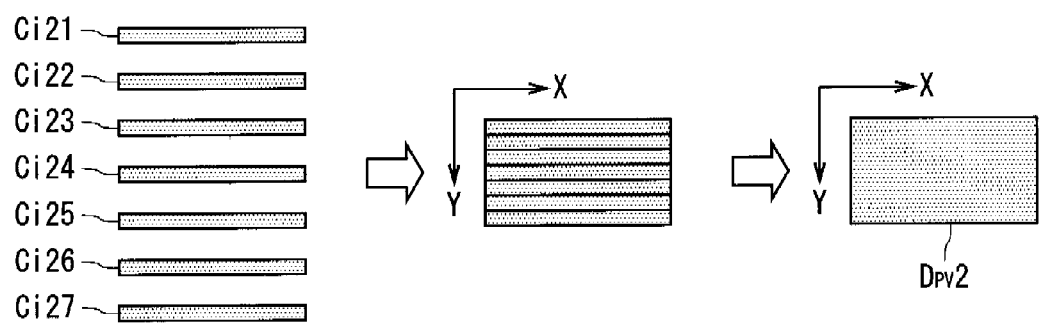
FIG. 12 is a diagram illustrating a method of generating a comparison distribution of pixel values.

Also, as shown in FIG. 12, first, pixel strings Ci21 to Ci27 about the comparison regions CR21 to CR27 are extracted from the target images G21 to G27. Here, the pixel strings Ci21 to Ci27 indicate the distributions of pixel values about the comparison regions CR21 to CR27 (hereinafter also referred to as "pixel value distributions"). More specifically, the pixel value distribution Ci21 about the comparison region CR21 is extracted from the target image G21, the pixel value distribution Ci22 about the comparison region CR22 is extracted from the target image G22, the pixel value distribution Ci23 about the comparison region CR23 is extracted from the target image G23, the pixel value distribution Ci24 about the comparison region CR24 is extracted from the target image G24, the pixel value distribution Ci25 about the comparison region CR25 is extracted from the target image G25, the pixel value distribution Ci26 about the comparison region CR26 is extracted from the target image G26, and the pixel value distribution Ci27 about the comparison region CR27 is extracted from the target image G27.

Next, the pixel value distributions Ci21 to Ci27 are arranged according to given arrangement rules to generate a two-dimensional pixel value distribution (hereinafter also referred to as "a comparison distribution) $D_{PV}2$. Here, the given arrangement rules are, for example, that the pixel value distributions Ci21 to Ci27 are arranged parallel to each other, and that the pixel value distribution Ci21, pixel value distribution Ci22, pixel value distribution Ci23, pixel value distribution Ci24, pixel value distribution Ci25, pixel value distribution Ci26, and pixel value distribution Ci27 are arranged in this order and integrated, so as to form a pixel value distribution about a rectangular region. The rectangular comparison distribution $D_{PV}2$ is thus generated.

In the generation of the reference distribution $D_{PV}1$ and the comparison distribution $D_{PV}2$, another order of arrangement may be adopted as long as the order of arrangement of the pixel value distributions Bi11 to Bi17 and the order of arrangement of the pixel value distributions Ci21 to Ci27 correspond to each other, for example.

<(1-2-4) Matching Point Detecting Block 340A>

The matching point detecting block 340A detects a matching point corresponding to the reference point $P_{ref}1$ in the target image group G2 by using the reference distribution $D_{PV}1$ and the comparison distribution $D_{PV}2$.

As to the method of the matching point search for detecting a matching point, for example, correlation methods in which amplitude components are suppressed are known, and it can be, for example, Phase Only Correlation (POC) or DCT sign only correlation (paper for reference: "Merger of Image Signal Processing and Image Patten Recognition-DCT Sign Only Correlation and its Applications" Hitoshi KIYA). In these correlation methods, similarity calculations are performed by using phase-only signals, with amplitude components suppressed, from frequency-resolved signals of patterns. In this preferred embodiment, a matching point search using phase only correlation is performed.

Figure 13:
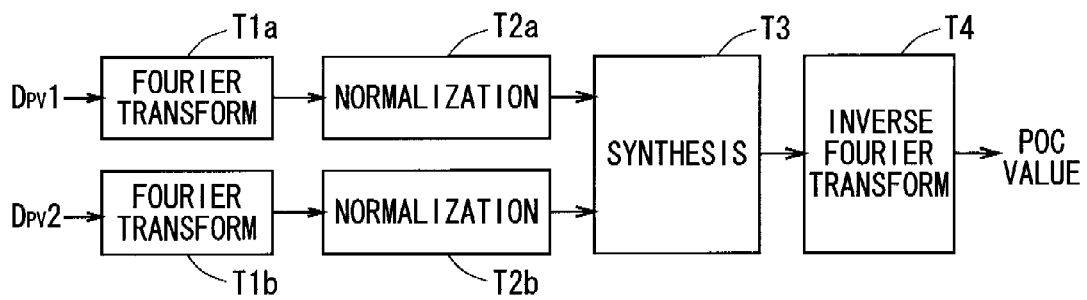
FIG. 13 is a diagram for illustrating a matching point search using phase only correlation.

FIG. 13 is a diagram for illustrating a matching point search using phase only correlation.

Here, the reference distribution $D_{PV}1$ and the comparison distribution $D_{PV}2$ are handled as image regions in which a given number, $N_1$, of pixels are arranged along X direction, and a given number, $N_2$, of pixels are arranged along Y direction. These image regions are represented by Expression 1 below.

$$f(n_1, n_2),\ \text{Size}\ N_1 \times N_2$$

$$g(n_1, n_2),\ \text{Size}\ N_1 \times N_2 \qquad \text{Expression 1}$$

Where, $n_1 = -M_1, \ldots, M_1$ $n_2 = -M_2, \ldots, M_2$

Here, $f(n_1, n_2)$ in Expression 1 above indicates the image region about the reference distribution $D_{PV}1$, and $g(n_1, n_2)$ in Expression 1 indicates the image region about the comparison distribution $D_{PV}2$. Also, $N_1$ and $N_2$ are set as $N_1=2M_1+1$, $N_2=2M_2+1$, for example.

First, two-dimensional Fourier transforms T1$a$ and T1$b$ using Expression 2 below are performed to the image regions of the reference distribution $D_{PV}1$ and the comparison distribution $D_{PV}2$.

$$F(k_1, k_2) = \sum_{n_1, n_2} f(n_1, n_2) W_{N_1}^{k_1 n_1} W_{N_2}^{k_2 n_2} \qquad \text{Expression 2}$$

$$G(k_1, k_2) = \sum_{n_1, n_2} g(n_1, n_2) W_{N_1}^{k_1 n_1} W_{N_2}^{k_2 n_2}$$

Where, $W_P = \text{EXP}\left(-j\frac{2\pi}{P}\right),\ k_s = -M_s, \ldots, M_s$ In the note of Expression 2, $N_1$ and $N_2$ are assigned to the subscript P of W, and 1 and 2 are assigned to the subscript s of k.

For the image regions subjected to the Fourier transforms T1$a$ and T1$b$, normalizations T2$a$ and T2$b$ are performed to remove image amplitude components by using the expressions shown as Expression 3 below.

$$F'(k_1, k_2) = \frac{F(k_1, k_2)}{|F(k_1, k_2)|},\quad G'(k_1, k_2) = \frac{G(k_1, k_2)}{|G(k_1, k_2)|} \qquad \text{Expression 3}$$

After normalizations T2$a$ and T2$b$, synthesis T3 using Expression 4 below is performed, and also two-dimensional inverse Fourier transform T4 using Expression 5 is performed. Correlation calculations between images are thus carried out and the results (POC value) are outputted.

$$R(k_1, k_2) = F'(k_1, k_2)\overline{G'(k_1, k_2)} \qquad \text{Expression 4}$$

$$r(k_1, k_2) = \frac{1}{N_1 N_2} \sum_{k_1, k_2} R(k_1, k_2) W_{N_1}^{-k_1 n_1} W_{N_2}^{-k_2 n_2} \qquad \text{Expression 5}$$

Figure 14:
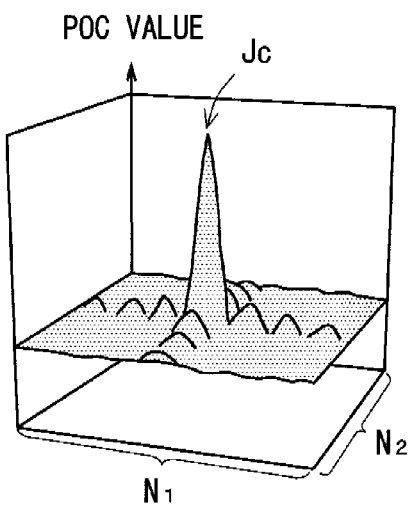
FIG. 14 is a diagram illustrating a distribution of POC values indicating the correlation between the reference and comparison regions.

By the operations above, the results (POC value) indicating the correlation between the reference distribution $D_{PV}1$ and the comparison distribution $D_{PV}2$ are obtained, and the obtained results (POC value) are as shown in FIG. 14, for example.

In FIG. 14, the POC value is large in the portion of the image region ($N_1 \times N_2$) where the correlation is high. In the image region about the comparison distribution $D_{PV}2$, the position corresponding to the peak Jc of POC value is the matching point on the target image G21 that corresponds to the center point (reference point) $P_{ref}1$ in the reference region BR11 on the reference image G11.

Since POC value is discretely obtained, the matching point may be detected more finely by performing interpolation between adjacent pixels and estimating the position of peak Jc in the size of sub-pixel that is finer than the size of one pixel. The method of interpolation can be a method where parabola function is obtained from the distribution of discretely obtained POC values, for example.

Figure 15:
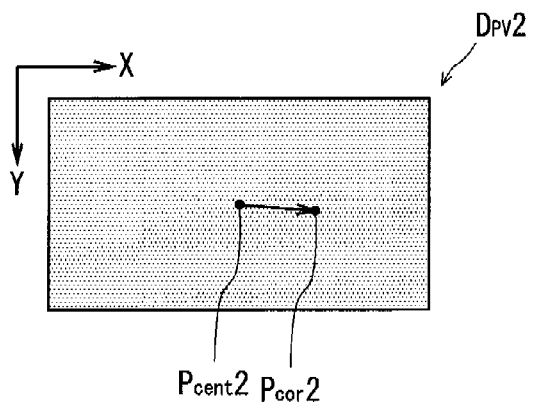
FIG. 15 is a diagram for illustrating how a matching point is detected.

By the matching point search using phase only correlation, as shown in FIG. 15, for example, a point $P_{cor}2$ shifted from the center point $P_{cent}2$ of the comparison distribution $D_{PV}2$ is detected as a point corresponding to the peak Jc of POC value. Then, in the target images G21 to G27, points having a positional relation like the positional relation between the center point $P_{cent}2$ and the point $P_{cor}2$ are detected as matching points, on the basis of the center points of the comparison regions CR21 to CR27.

<(1-2-5) Arrangement Change Detecting Block 350>

The arrangement change detecting block 350 detects a change of the condition of arrangement of the first camera 21 and the second camera 22 by recognizing that the relation between the position of the reference point $P_{ref}1$ in the multiple reference images G11 to G17 and the position corresponding to the point $P_{cor}2$ in the multiple target images G21 to G27 has changed in Y direction different from X direction of the base length. That is to say, the arrangement change detecting block 350B detects a change of the condition of arrangement about the relative arrangement of the first viewpoint and the second viewpoint.

For example, as shown in FIG. 15, in the comparison distribution $D_{PV}2$, the arrangement change detecting block 350 detects a change of the condition of arrangement when the amount of shift in Y direction between the center point $P_{cent}2$ and the point $P_{cor}2$ has changed from a predetermined reference amount of shift (a reference amount of shift). Then, display 302 visually outputs a display element indicating that an adjustment operation (calibration) about the change of the arrangement relation should be performed. The reference amount of shift is the amount of shift in Y direction between the center point $P_{cent}2$ and the point $P_{cor}2$ when calibration is carried out, and it is updated every time calibration is performed and stored in the storage 304.

The calibration will be briefly described below.

Figure 16:
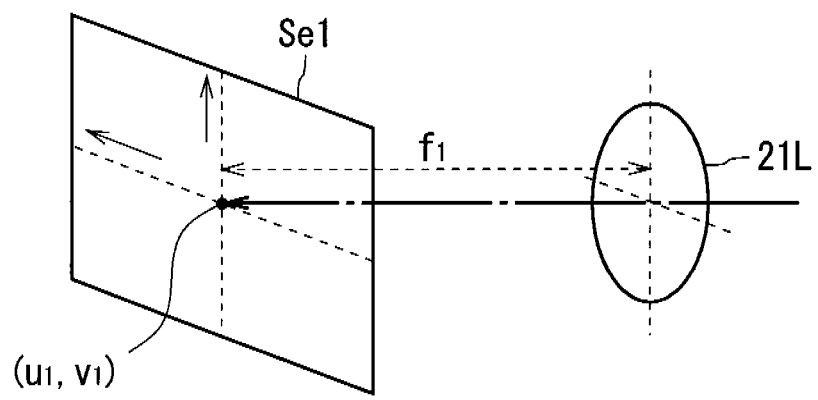
FIG. 16 is a diagram illustrating the relation between an imaging lens and an imaging element in a first camera.
Figure 17:
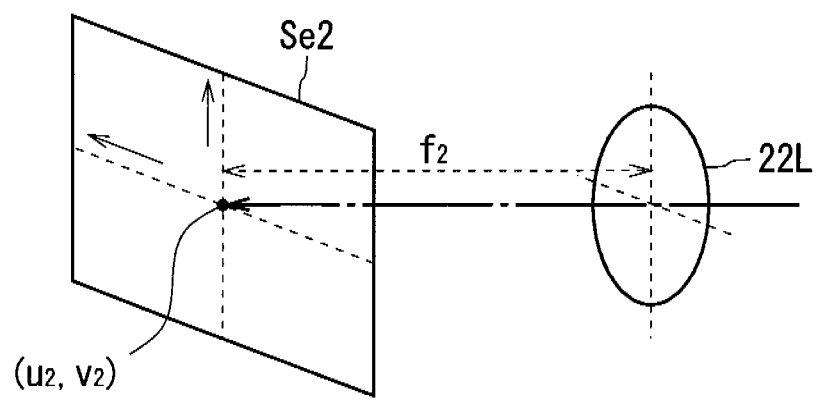
FIG. 17 is a diagram illustrating the relation between an imaging lens and an imaging element in a second camera.

FIG. 16 is a diagram illustrating the relation between the imaging lens 21L and the imaging element Se1 in the first camera 21, and FIG. 17 is a diagram illustrating the relation between the imaging lens 22L and the imaging element Se2 in the second camera 22.

Here, first, when the coordinates M of a three-dimensional point in space is taken as the coordinates $m_1$ of a two-dimensional point in the reference image taken and obtained by the first camera 21, and also as the coordinates $m_2$ of a two-dimensional point in the target image taken and obtained by the second camera 22, then the relations of the following expressions (1) and (2) hold with projection matrices $P_1$ and $P_2$.

Expression 6

$$\lambda \tilde{m}_1 = P_1 \cdot \tilde{M} = \begin{pmatrix} \alpha_1 & \gamma_1 & u_1 \\ 0 & \beta_1 & v_1 \\ 0 & 0 & 1 \end{pmatrix} (R_1 \ t_1) \cdot \tilde{M} \quad (1)$$

$$= \begin{pmatrix} \alpha_1 & \gamma_1 & u_1 \\ 0 & \beta_1 & v_1 \\ 0 & 0 & 1 \end{pmatrix} \begin{pmatrix} 1 & 0 & 0 & 0 \\ 0 & 1 & 0 & 0 \\ 0 & 0 & 1 & 0 \end{pmatrix} \cdot \tilde{M}$$

$$\lambda \tilde{m}_2 = P_2 \cdot \tilde{M} = \begin{pmatrix} \alpha_2 & \gamma_2 & u_2 \\ 0 & \beta_2 & v_2 \\ 0 & 0 & 1 \end{pmatrix} (R_2 \ t_2) \cdot \tilde{M} \quad (2)$$

Where, $\tilde{M}$ is the transposed matrix of the homogeneous coordinates of the coordinates M of the three-dimensional point;

$\tilde{m}_1$, is the transposed matrix of the homogeneous coordinates of the coordinates $m_1$ of the two-dimensional point;

$\tilde{m}_2$ is the transposed matrix of the homogeneous coordinates of the coordinates $m_2$ of the two-dimensional point;

$\lambda$ is scale coefficient;

$\alpha_1 = f_1 \times sx_1$, $\beta_1 = f_1 \times s_{y1}$;

$\alpha_2 = f_2 \times sx_2$, $\alpha_2 = f_2 \times sy_2$;

$f_1$ is the focal length of the first camera;

$f_2$ is the focal length of the second camera;

$sx_1$ is the length in X direction of the imaging sensor of the first camera;

$sy_1$ is the length in Y direction of the imaging sensor of the first camera;

$sx_2$ is the length in X direction of the imaging sensor of the second camera;

$sy_2$ is the length in Y direction of the imaging sensor of the second camera;

$(u_1, v_1)$ is the optical center of the imaging lens of the first camera;

$(u_2, v_2)$ is the optical center of the imaging lens of the second camera;

$\gamma_1$ is the skew factor about the first camera;

$\gamma_2$ is the skew factor about the second camera;

$R_1$ is the rotation component about the arrangement of the first camera based on the first camera;

$t_1$ is the translation component about the arrangement of the first camera based on the first camera;

$R_2$ is the rotation component about the arrangement of the second camera based on the first camera; and $t_2$ is the translation component about the arrangement of the second camera based on the first camera.

When the skews in the first and second cameras 21 and 22 are not considered, the skew factor values $\gamma_1$ and $\gamma_2$ are zero. Then, when the projection matrices $P_1$ and $P_2$ of the expressions (1) and (2) are obtained, the arrangement relation of the first camera 21 and the second camera 22 is obtained.

Now, a simplest method for obtaining the projection matrices $P_1$ and $P_2$ can be a method using reference and target images obtained by imaging, with the stereo camera 2A, an object for calibration whose three-dimensional size is known. Specifically, the projection matrices $P_1$ and $P_2$ are each a 3×4 matrix and have 12 parameters. When one of the 12 parameters is normalized to 1, the 12 parameters are reduced to 11 parameters. Accordingly, the projection matrices $P_1$ and $P_2$ are uniquely obtained when six or more sets of coordinates M of a three-dimensional point in space and coordinates $m_1$ and $m_2$ of the corresponding two-dimensional points are given about reference and target images. The method for detecting the coordinates $m_1$ and $m_2$ of two-dimensional points corresponding to the coordinates M of the three-dimensional point can be a method in which a portion of the coordinates M about a characteristic shape of the calibration object is detected in the reference and target images, for example.

In this way, the operation of calculating the projection matrices $P_1$ and $P_2$ indicating the arrangement relation of the first camera 21 and the second camera 22 corresponds to the calibration. In the calibration, the calculated projection matrices $P_1$ and $P_2$ are stored in the storage 304 as transform data $D_{trans}$ and utilized in the distance measuring processing.

The various information processing operations in the calibration are started as a user operates the operation unit 301, with the stereo camera 2A and an object for calibration appropriately arranged, and the operations are executed under the control by the controller 300A.

<(1-2-6) Distance Calculating Block 360>

The distance calculating block 360 calculates the distance from the stereo camera 2A to the portion of the object OB that corresponds to the reference point $P_{ref}1$ on the basis of the coordinates of the reference point $P_{ref}1$ in the reference image G11 and the coordinates of the matching point in the target image G21 detected by the matching point detecting block 340A.

Specifically, the transform data $D_{trans}$ obtained by the calibration and stored in the storage 304 (specifically, the projection matrices $P_1$ and $P_2$) is substituted into the expressions (1) and (2), and the coordinate values of the reference point $P_{ref}1$ are substituted into the expression (1) as the values of the coordinates $m_1$, and the coordinate values of the matching point corresponding to the reference point $P_{ref}1$ are substituted into the expression (2) as the values of the coordinates $m_2$. Then, the coordinates M of the three-dimensional point about the portion of the object OB that corresponds to the reference point $P_{ref}1$ are obtained as the two expressions are solved. Then, for example, when the three-dimensional coordinates of the stereo camera 2A is taken as the origin, it is easy to calculate the distance from the stereo camera 2A to the portion of the object OB that corresponds to the reference point $P_{ref}1$, on the basis of the obtained coordinates M.

The distance data $L_{data}$ calculated here is stored in the storage 304 in association with the coordinates M of the corresponding three-dimensional point.

<(1-3) Operations of Image Processing Apparatus>

Figure 18:
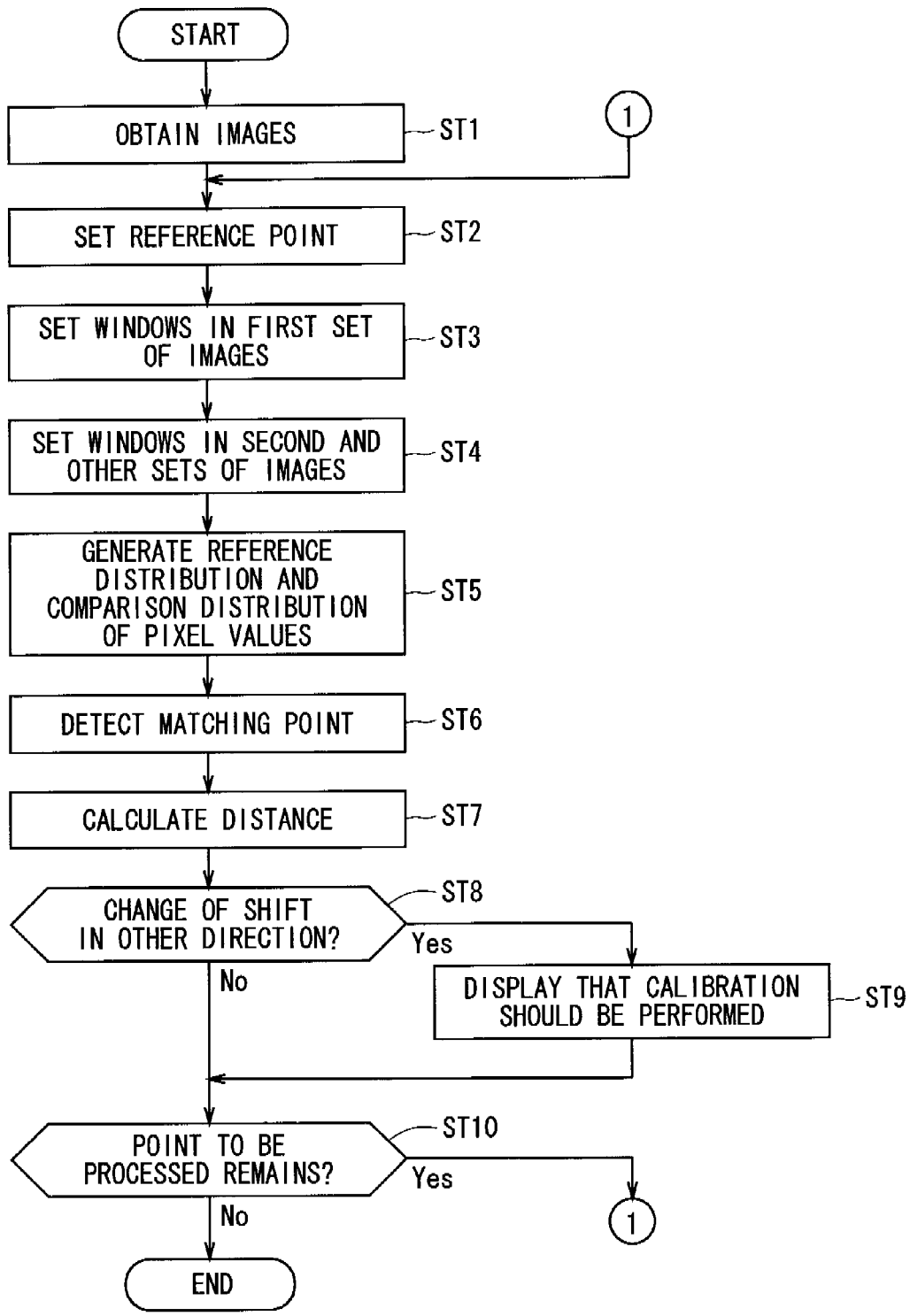
FIG. 18 is a flowchart illustrating an operation flow in the image processing apparatus.

FIG. 18 is a flowchart illustrating the operation flow of the matching point search processing, arrangement change detecting processing, and distance measuring processing in the image processing apparatus 3A. This operation flow is implemented as the controller 300A executes the program PGa, and the operation flow is started as a user variously operates the operation unit 301 and the flow moves to step ST1 in FIG. 18.

In step ST1, the image obtaining block 310 obtains a reference image group G1 and a target image group G2.

In step ST2, the region setting block 320A sets one pixel in the reference image G11 as a reference point $P_{ref}1$.

In step ST3, the region setting block 320A sets windows in the reference image G11 and the target image G21 that form the first set of images. Here, a reference region BR11 as a one-dimensional window is set in the reference image G11, and a comparison region CR21, having the same form and size as the reference region BR11, is set in the target image G21.

In step ST4, the region setting block 320A sets windows in the reference images G12 to G17 and the target images G22 to G27 that form the second and following sets of images. Here, reference regions BR12 to BR17, corresponding to the form, size, and arrangement position of the reference region BR11, are set in the reference images G12 to G17, and comparison regions CR22 to CR27, corresponding to the form, size and arrangement position of the comparison region CR21, are set in the target images G22 to G27.

In step ST5, the pixel value distribution generating block 330A generates one reference distribution $D_{PV}1$ about two-dimensional space from the distributions of pixel values about the plurality of reference regions BR11 to BR17, and also generates one comparison distribution $D_{PV}2$ about two-dimensional space from the distributions of pixel values about the plurality of comparison regions CR21 to CR27.

In step ST6, on the basis of the reference distribution $D_{PV}1$ and the comparison distribution $D_{PV}2$, the matching point detecting block 340A detects a matching point corresponding to the reference point $P_{ref}1$ from the target image group G2.

In step ST7, on the basis of the coordinates of the reference point $P_{ref}1$ in the reference image G11 and the coordinates of the matching point in the target image G21 detected in step ST6, the distance calculating block 360 calculates the three-dimensional coordinates of the portion of the object OB that corresponds to the reference point $P_{ref}1$, and the distance to the portion of the object OB corresponding to the reference point $P_{ref}1$, on the basis of the stereo camera 2A. The data indicating the three-dimensional coordinates and distance thus calculated is stored in the storage 304 in association with information indicating the reference point $P_{ref}1$.

In step ST8, the arrangement change detecting block 350 judges whether the relation between the position of the reference point $P_{ref}1$ in the multiple reference images G11 to G17 and the position about the point $P_{cor}2$ in the multiple target images G21 to G27 has changed in Y direction different from X direction based on the base length. When the amount of shift in Y direction between the positions about the reference point $P_{ref}1$ and the point $P_{cor}2$ has changed from the predetermined reference amount of shift, the flow moves to step ST9; when the amount of shift in Y direction between the positions about the reference point $P_{ref}1$ and the point $P_{cor}2$ has not changed from the predetermined reference amount of shift, the flow moves to step ST10.

In step ST9, according to a signal output from the arrangement change detecting block 350, the display 302 visually outputs a display element indicating that an adjustment operation (calibration) should be performed. The visual output of the display element indicating that the calibration should be performed may be continued until calibration is performed, for example. The information that calibration should be performed may be given by voice.

In step ST10, the region setting block 320A judges whether there remain any points to be set as reference point $P_{ref}1$ (points to be processed) in the reference image G11. For example, it judges whether all pixels of the reference image G11 have been set as reference point $P_{ref}1$. When there remains any point to be processed, the flow returns to step ST2 and another pixel in the reference image G11 is set as reference point $P_{ref}1$ and steps ST3 to ST9 are performed. When no point to be processed remains, the operation flow is ended.

Figure 19:
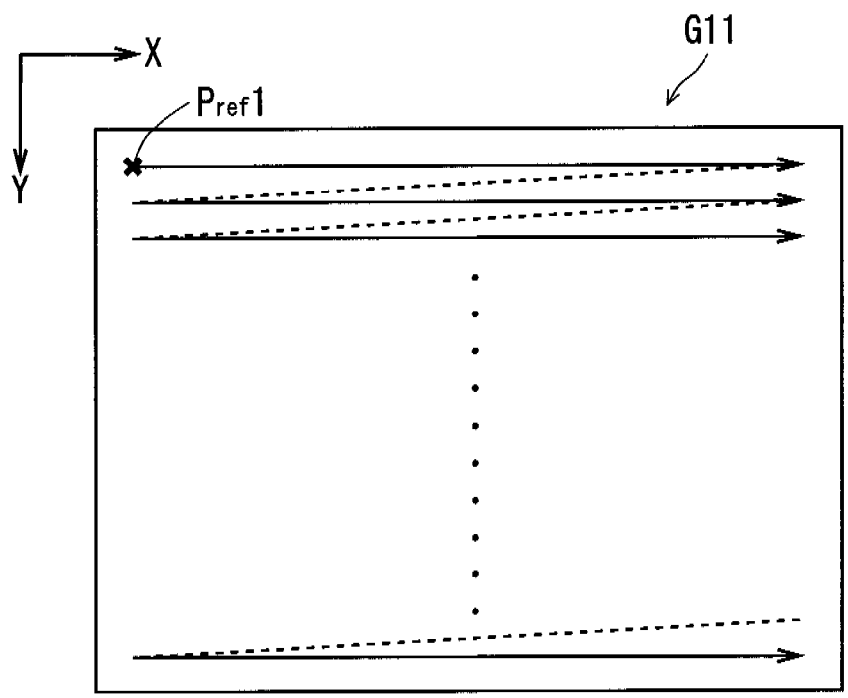
FIG. 19 is a schematic diagram illustrating how a reference point is sequentially set in a reference image.

According to the operation flow above, as shown in the arrows in FIG. 19 in the reference image G11, for example, the reference point $P_{ref}1$ is time-sequentially set, while shifted one pixel at a time, sequentially from the top (−Y direction) and from left to right (X direction), and matching points corresponding to the reference points $P_{ref}1$ are detected on the target images G21 to G27. Matching points may be detected about reference points at intervals of a given number of pixels in the reference image G11.

As described so far, according to the image processing apparatus 3A of the first preferred embodiment, the reference regions BR11 to BR17 set in the reference images G11 to G17 and the comparison regions CR21 to CR27 set in the target images G21 to G27 are relatively small regions about pixel strings along X direction. Accordingly, it is possible to suppress coexistence of distant and near views in the image regions of the reference regions BR11 to BR17 and the comparison regions CR21 to CR27 used in the calculations for the matching point search.

Also, the amount of information used for the matching point search is maintained by utilizing the information about the reference regions BR11 to BR17 set in the time-sequentially obtained reference images G11 to G17 and the information about the comparison regions CR21 to CR27 set in the time-sequentially obtained target images G21 to G27. That is to say, it is possible to ensure an amount of information used in the calculations for matching point search, while reducing the size of the image regions used in the calculations for the matching point search, in the reference and target images. Also, influences of noise on the images are reduced.

Thus, the amount of information used in the calculations for matching point search is ensured while reducing the size of the image regions used in the calculations for matching point search in individual images, and therefore the precision of the matching point search is improved while reducing the influences of coexistence of distant and near views (distant-near competing). That is to say, it is possible to improve the precision of the matching point search with a plurality of images taking the same object where distant and near views coexist.

In the matching point search, two artificial two-dimensional regions are used for the calculations, so that the precision of the matching point search is improved without increasing the amount of calculations in comparison to conventional ones.

Then, as a result of the improved precision of the matching point search, the distance to the object OB can be more accurately obtained from the reference images G11 to G17 and the target images G21 to G27 taking the same object where distant and near views coexist.

Also, when the relative arrangement between the first and second viewpoints of the stereo camera 2A has shifted due to aged deterioration, impact, etc., information indicating that calibration should be performed is given. Accordingly, the user can perform adjustment operations according to the condition of arrangement.

<(2) Second Preferred Embodiment>
<(2-1) Differences from First Preferred Embodiment>

In the information processing system 1A of the first preferred embodiment, the amount of shift between the optical axis of the imaging lens 21L and the optical axis of the imaging lens 22L in the stereo camera 2A is the distance $L_{ax}$ in x direction, and the elongate direction of the reference regions BR11 to BR17 and the comparison regions CR21 to CR27 is set in X direction in the matching point search processing.

Figure 20:
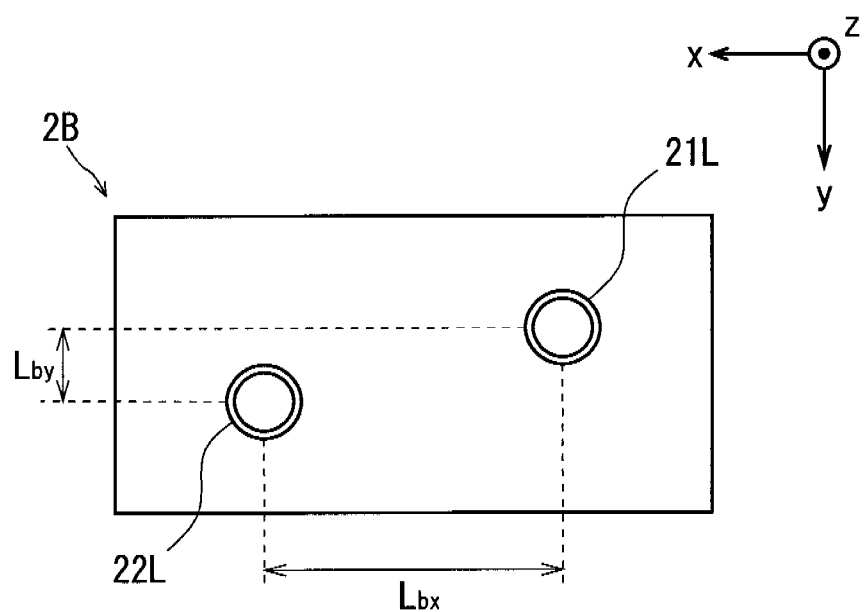
FIG. 20 is a schematic diagram illustrating the appearance of an example structure of a stereo camera according to a second preferred embodiment.

On the other hand, in an information processing system 1B of a second preferred embodiment, as shown in FIG. 20, the amount of shift between the optical axis of an imaging lens 21L and the optical axis of an imaging lens 22L in a stereo camera 2B is set as a distance $L_{bx}$ in x direction and a distance $L_{by}$ in y direction. Also, in the image processing apparatus 3B of the second preferred embodiment, for each reference point, a matching point search using reference regions and comparison regions whose elongate direction is set in X direction, and a matching point search using reference regions and comparison regions whose elongate direction is set in Y direction, are performed, and the result of a matching point search with higher reliability is determined as a matching point corresponding to the reference point. This further enhances the precision of the matching point search with a plurality of images taking the same object where distant and near views coexist.

Specifically, in the information processing system 1B of the second preferred embodiment, as compared with the information processing system 1A of the first preferred embodiment, the stereo camera 2A is replaced by the stereo camera 2B where the arrangement of the first and second cameras 21 and 22 is changed, and the image processing apparatus 3A is replaced by an image processing apparatus 3B where the controller 300A is changed to a controller 300B having different functions. In the controller 300B, various functions are implemented as a program PGb stored in a storage 304 is read and executed. Other parts of the information processing system 1B of the second preferred embodiment are the same as those of the information processing system 1A of the first preferred embodiment. Therefore the same parts are shown by the same reference characters and the same explanations are not repeated.

<(2-2) Functions of Image Processing Apparatus>

Figure 21:
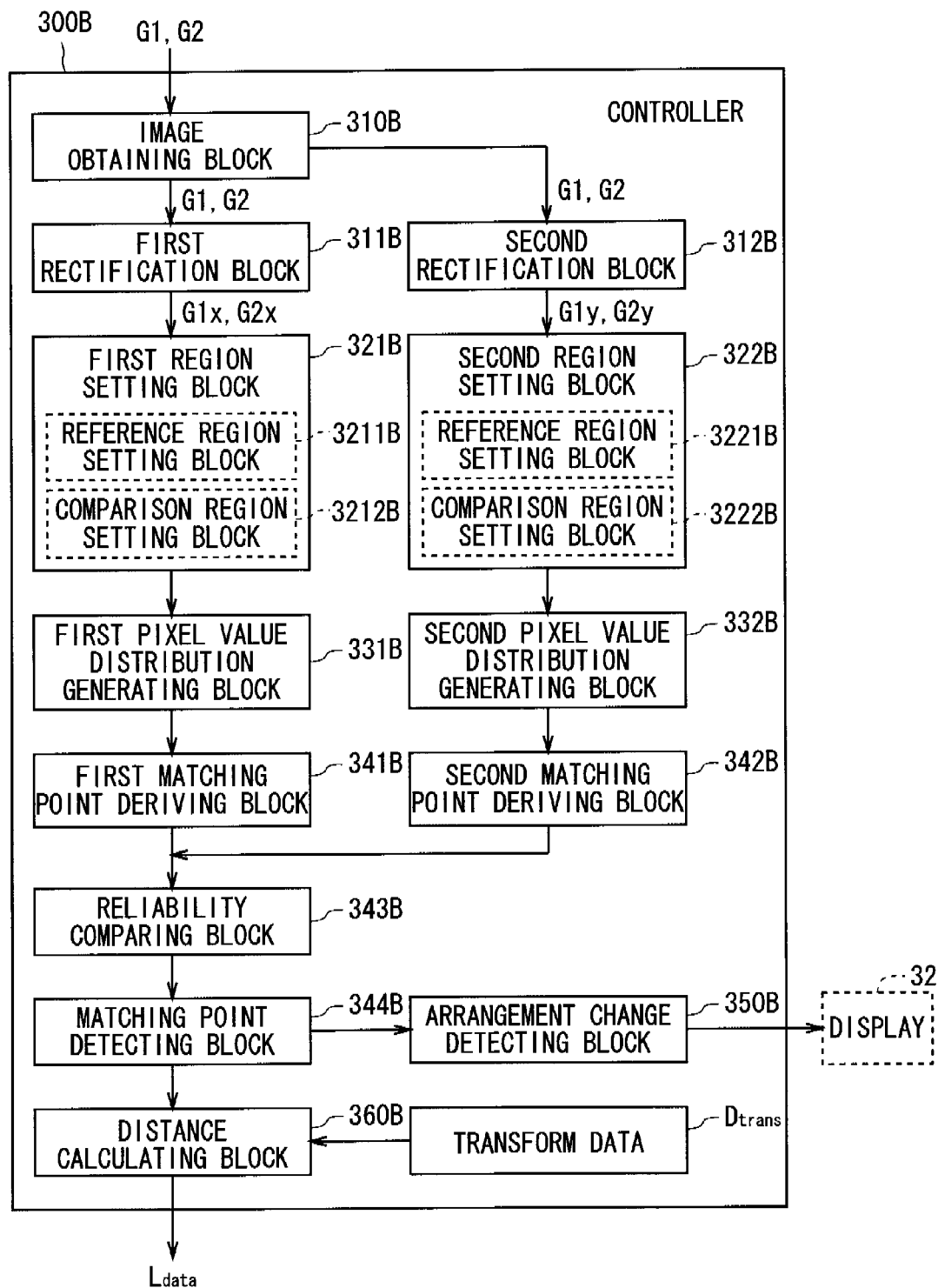
FIG. 21 is a block diagram illustrating the functional parts implemented by the controller of the image processing apparatus of the second preferred embodiment.

FIG. 21 is a block diagram illustrating the functional configuration implemented in the controller 300B of the image processing apparatus 3B. As show in FIG. 21, as the functional configuration, the controller 300B has an image obtaining block 310B, a first rectification block 311B, a second rectification block 312B, a first region setting block 321B, a second region setting block 322B, a first pixel value distribution generating block 331B, a second pixel value distribution generating block 332B, a first matching point deriving block 341B, a second matching point deriving block 342B, a reliability comparing block 343B, a matching point detecting block 344B, an arrangement change detecting block 350B, and a distance calculating block 360B. The functional configuration will be described below.

<(2-2-1) Image Obtaining Block 310B>

Like the image obtaining block 310 of the first preferred embodiment, the image obtaining block 310B obtains a reference image group G1 by time-sequentially imaging an object OB from a first viewpoint with the first camera 21, and a target image group G2 by time-sequentially imaging the object OB from a second viewpoint with the second camera 22.

<(2-2-2) First Rectification Block 311B>

Figure 22:
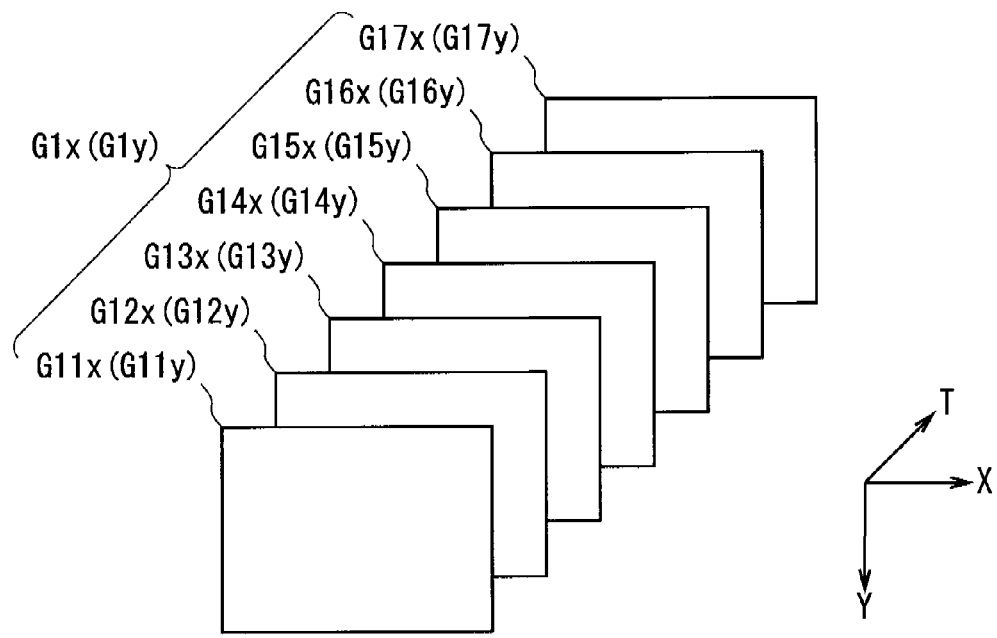
FIG. 22 is a schematic diagram illustrating a specific example of reference X-direction and reference Y-direction parallax suppressed image groups.

From a plurality of reference images G11 to G17 of the reference image group G1, the first rectification block 311B generates a plurality of images (reference Y-direction parallax suppressed images) G11x to G17x in which parallax in Y direction is suppressed. FIG. 22 is a diagram illustrating a specific example of an image group (reference Y-direction parallax suppressed image group) G1x formed of a plurality of reference Y-direction parallax suppressed images G11x to G17x.

Figure 23:
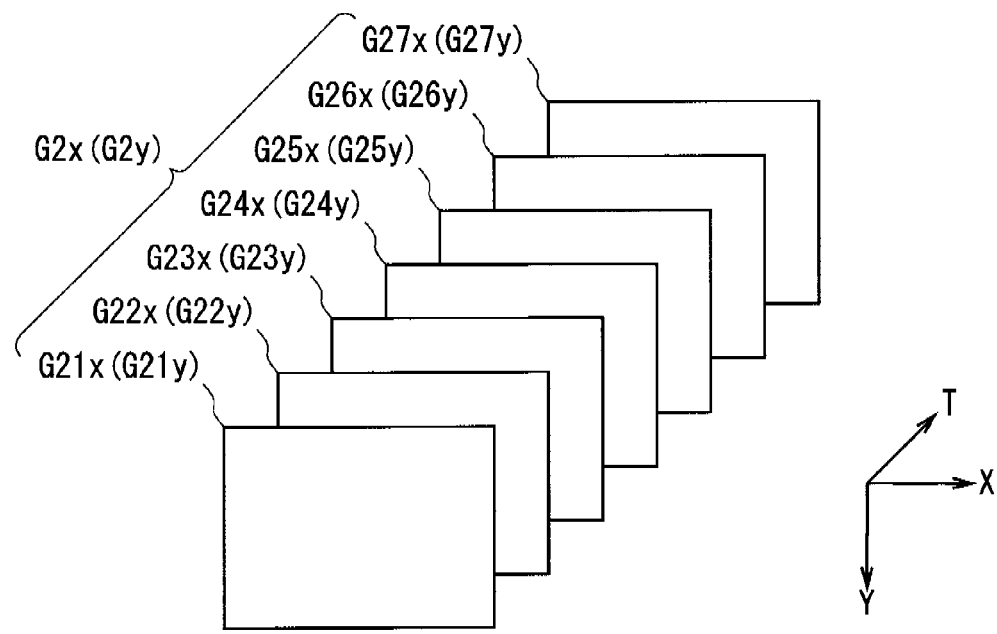
FIG. 23 is a schematic diagram illustrating a specific example of target X-direction and target Y-direction parallax suppressed image groups.

Also, from a plurality of target images G21 to G27 of the target image group G2, the first rectification block 311B generates a plurality of images (target Y-direction parallax suppressed images) G21x to G27x in which parallax in Y direction is suppressed. FIG. 23 is a diagram illustrating a specific example of an image group (target Y-direction parallax suppressed image group) G2x formed of a plurality of target Y-direction parallax suppressed images G21x to G27x.

In the description below, the processing in which the first rectification block 311B generates a plurality of reference Y-direction parallax suppressed images G11x to G17x from a plurality of reference images G11 to G17 and generates a plurality of target Y-direction parallax suppressed images G21x to G27x from a plurality of target images G21 to G27 is referred to as "a first rectification processing" as needed.

Now, an example of a method of suppressing parallax in Y direction in the plurality of reference images G11 to G17 and the plurality of target images G21 to G27 will be briefly described.

A stereo camera in which the first camera 21 and the second camera 22 are separated only in x direction (rectification stereo camera) has, as shown in the expressions (3) and (4) below, a relation in which a rectification matrix $S_1$ is added to the right side of the expression (1), and a rectification matrix $S_2$ is added to the right side of the expression (2).

Expression 7

$$\lambda \tilde{m}_1 = S_1 \cdot P_1 \cdot \tilde{M} = P_{1a} \cdot \tilde{M} \quad (3)$$

$$\lambda \tilde{m}_2 = S_2 \cdot P_2 \cdot \tilde{M} = P_{2a} \cdot \tilde{M} \quad (4)$$

$$P_{1a} = \begin{pmatrix} \alpha & \gamma & u \\ 0 & \beta & v \\ 0 & 0 & 1 \end{pmatrix} \begin{pmatrix} & & 0 \\ & R & 0 \\ & & 0 \end{pmatrix} \quad (5)$$

$$P_{2a} = \begin{pmatrix} \alpha & \gamma & u \\ 0 & \beta & v \\ 0 & 0 & 1 \end{pmatrix} \begin{pmatrix} & & B \\ & R & 0 \\ & & 0 \end{pmatrix} \quad (6)$$

Where $S_1$ and $S_2$ are rectification matrices.

As shown by the expression (3) above, when the product of the rectification matrix $S_1$ and the projection matrix $P_1$ is a projection matrix $P_{1a}$, the projection matrix $P_{1a}$ is represented by the expression (5) above. Also, as shown by the expression (4), when the product of the rectification matrix $S_2$ and the projection matrix $P_2$ is a projection matrix $P_{2a}$, the projection matrix $P_{2a}$ is represented by the expression (6). In the expressions (5) and (6), R represents a rotation component about the arrangement of the first and second cameras 21 and 22 on the basis of the perpendicular three axes, and B represents a translation x component corresponding to the base length in x direction between the first camera 21 and the second camera 22. Also, in the expressions (5) and (6) above, assuming that the internal setting conditions in the first camera 21 and the second camera 22 are identical, $\alpha_1$ and $\alpha_2$ have the same value $\alpha$, $\beta_1$ and $\beta_2$ have the same value $\beta$, $\gamma_1$ and $\gamma_2$ have the same value $\gamma$, $u_1$ and $u_2$ have the same value u, and $v_1$ and $v_2$ have the same value v.

Then, between the projection matrix $P_{1a}$ and the projection matrix $P_{2a}$, there is only a difference of an external parameter, translation x component B about the first and second cameras 21 and 22.

When the three-dimensional coordinates are rotated such that the external parameter rotation component is an identity matrix, the projection matrix $P_{1aa}$ about the first camera 21 of the rectification stereo camera is represented by the expression (7) below, and the projection matrix $P_{2aa}$ about the second camera 22 of the rectification stereo camera is represented by the expression (8) below.

Expression 8

$$P_{1aa} = P_{1a}\begin{pmatrix} R^T & 0 \\ 0 & 1 \end{pmatrix} = \begin{pmatrix} \alpha & \gamma & u \\ 0 & \beta & v \\ 0 & 0 & 1 \end{pmatrix}\begin{pmatrix} 1 & 0 & 0 & 0 \\ 0 & 1 & 0 & 0 \\ 0 & 0 & 1 & 0 \end{pmatrix} = \begin{pmatrix} \alpha & \gamma & u & 0 \\ 0 & \beta & v & 0 \\ 0 & 0 & 1 & 0 \end{pmatrix} \quad (7)$$

$$P_{2aa} = P_{2a}\begin{pmatrix} R^T & 0 \\ 0 & 1 \end{pmatrix} = \begin{pmatrix} \alpha & \gamma & u \\ 0 & \beta & v \\ 0 & 0 & 1 \end{pmatrix}\begin{pmatrix} 1 & 0 & 0 & B \\ 0 & 1 & 0 & 0 \\ 0 & 0 & 1 & 0 \end{pmatrix} = \begin{pmatrix} \alpha & \gamma & u & B\alpha \\ 0 & \beta & v & 0 \\ 0 & 0 & 1 & 0 \end{pmatrix} \quad (8)$$

Then, by using the 3×4 projection matrices $P_1$ and $P_2$ obtained by the calibration described in the first preferred embodiment, the rectification matrices $S_1$ and $S_2$ are calculated.

Specifically, the relations of expressions (9) and (10) below hold when the rectification matrix $S_1$ is a 3×3 matrix including 9 parameters $s1_{11}$, $s1_{12}$, $s1_{13}$, $s1_{21}$, $s1_{22}$, $s1_{23}$, $s1_{31}$, $s1_{32}$, $s1_{33}$ and the rectification matrix $S_2$ is a 3×3 matrix including 9 parameters $s2_{11}$, $s2_{12}$, $s2_{13}$, $s2_{21}$, $s2_{22}$, $s2_{23}$, $s2_{31}$, $s2_{32}$, $s2_{33}$.

Expression 9

$$S_1 \cdot P_1 = \begin{pmatrix} s1_{11} & s1_{12} & s1_{13} \\ s1_{21} & s1_{22} & s1_{23} \\ s1_{31} & s1_{32} & s1_{33} \end{pmatrix} \cdot P_1 = \begin{pmatrix} \alpha & \gamma & u & 0 \\ 0 & \beta & v & 0 \\ 0 & 0 & 1 & 0 \end{pmatrix} = P_{1aa} \quad (9)$$

$$S_2 \cdot P_2 = \begin{pmatrix} s2_{11} & s2_{12} & s2_{13} \\ s2_{21} & s2_{22} & s2_{23} \\ s2_{31} & s2_{32} & s2_{33} \end{pmatrix} \cdot P_2 = \begin{pmatrix} \alpha & \gamma & u & B\alpha \\ 0 & \beta & v & 0 \\ 0 & 0 & 1 & 0 \end{pmatrix} = P_{2aa} \quad (10)$$

Here, the number of unknown parameters of the rectification matrix $S_1$ is 9, the number of unknown parameters of the rectification matrix $S_2$ is 9, and the number of other unknown parameters ($\alpha$, $\beta$, $\gamma$, u, v, B) is 6, and so the total number of unknown parameters is 24. Then, when the 3×4 projection matrices $P_1$ and $P_2$ obtained by the calibration are applied to the expressions (9) and (10) above, 24 expressions are obtained, and the numerical values of the 24 unknown parameters are derived as the 24 expressions are solved. The rectification matrices $S_1$ and $S_2$ are thus obtained.

By using the rectification matrices $S_1$ and $S_2$ thus obtained, the two-dimensional coordinates ($x_1$, $y_1$) in the reference images G11 to G17 and the two-dimensional coordinates ($X_1$, $Y_1$) in the reference Y-direction parallax suppressed images G11x to G17x have the relation of the expression (11) below. Also, the two-dimensional coordinates ($x_2$, $y_2$) in the target images G21 to G27 and the two-dimensional coordinates ($X_2$, $Y_2$) in the target Y-direction parallax suppressed images G21x to G27x have the relation of expression (12) below.

Expression 10

$$(X_1, Y_1, 1)^T = S_1 \cdot (x_1, y_1, 1)^T \quad (11)$$

$$(X_2, Y_2, 1)^T = S_2 \cdot (x_2, y_2, 1)^T \quad (12)$$

Thus, by using the expressions (11) and (12), the reference Y-direction parallax suppressed images G11x to G17x, where parallax in Y direction is suppressed, are generated from the reference images G11 to G17, and the target Y-direction parallax suppressed images G21x to G27x, where parallax in Y direction is suppressed, are generated from the target images G21 to G27.

<(2-2-3) Second Rectification Block 312B>

From the plurality of reference images G11 to G17 of the reference image group G1, the second rectification block 312B generates a plurality of images (reference X-direction parallax suppressed images) G11y to G17y in which parallax in X direction is suppressed. Then, as shown in FIG. 22, the plurality of reference X-direction parallax suppressed images G11y to G17y form an image group (reference X-direction parallax suppressed image group) G1y.

Also, from the plurality of target images G21 to G27 of the target image group G2, the second rectification block 312B generates a plurality of images (target X-direction parallax suppressed images) G21y to G27y in which parallax in X direction is suppressed. Then, as shown in FIG. 23, the plurality of target X-direction parallax suppressed images G21y to G27y form an image group (target X-direction parallax suppressed image group) G2y.

In the description below, the processing in which the second rectification block 312B generates a plurality of reference X-direction parallax suppressed images G11y to G17y from a plurality of reference images G11 to G17 and generates a plurality of target X-direction parallax suppressed images G21y to G27y from a plurality of target images G21 to G27 is referred to as "a second rectification processing" as needed.

As to the method of suppressing parallax in X direction in the plurality of reference images G11 to G17 and the plurality of target images G21 to G27, a method like that of suppressing parallax in Y direction described above can be adopted, for example. However, while the external parameter, translation x component in expression (6) is B in the Y-direction parallax suppressing method, it is necessary in the X-direction parallax suppressing method to change the external parameter, translation y component in expression (6) to B, and to change the x component to 0.

<(2-2-4) First Region Setting Block 321B>

The first region setting block 321B includes a reference region setting block 3211B and a comparison region setting block 3212B. The reference region setting block 3211B sets reference regions as one-dimensional windows respectively in the reference Y-direction parallax suppressed images G11x to G17x generated by the first rectification block 311B. The comparison region setting block 3212B sets comparison regions as one-dimensional windows respectively in the target Y-direction parallax suppressed images G21x to G27x generated by the first rectification block 311B.

Figure 24:
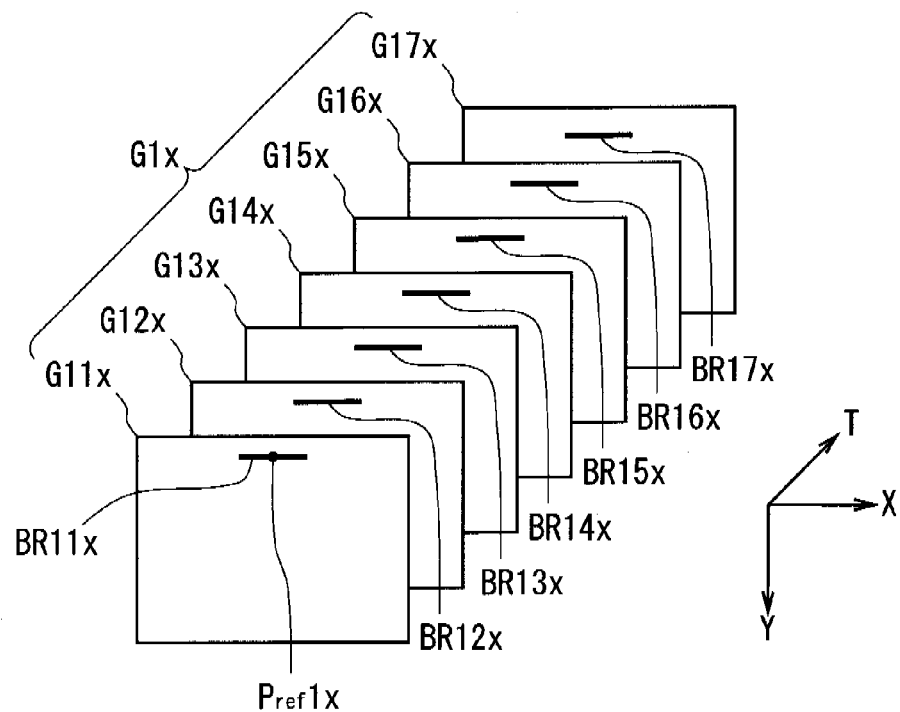
FIG. 24 is a schematic diagram illustrating how reference regions are set in the second preferred embodiment.

Specifically, as shown in FIG. 24, a one-dimensional reference region BR11x that includes a reference point $P_{ref}1x$ as a center point and that is about a pixel string along X direction is set in the reference Y-direction parallax suppressed image G11x. Also, as shown in FIG. 25, a one-dimensional comparison region CR21x about a pixel string along X direction is set in the target Y-direction parallax suppressed image G21x.

The reference region BR11x and the comparison region CR21x have a corresponding form and size (the same form and size), and the position of setting of the reference region BR11x in the reference Y-direction parallax suppressed image G11x and the position of setting of the comparison region CR21x in the target Y-direction parallax suppressed image G21x have a positional relation that is shifted in X direction by an amount corresponding to the amount of shift $L_{bx}$ in x direction between the optical axis of the imaging lens 21L and the optical axis of the imaging lens 22L.

In this way, the first region setting block 321B sets the reference region BR11x and the comparison region CR21x in the first image set formed of the reference Y-direction parallax suppressed image G11x and target Y-direction parallax suppressed image G21x.

Figure 25:
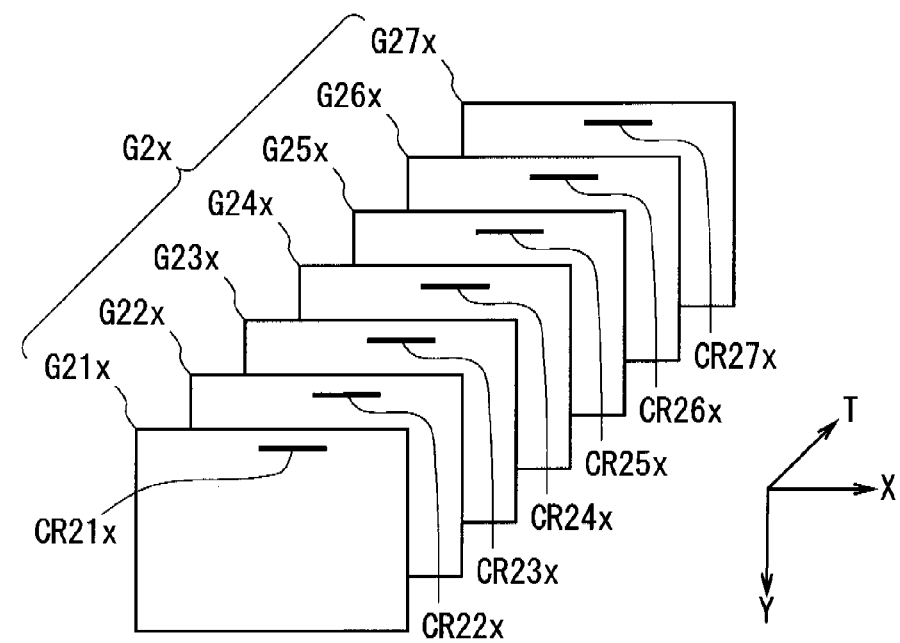
FIG. 25 is a schematic diagram illustrating how comparison regions are set in the second preferred embodiment.

Also, as shown in FIG. 24, reference regions BR12x to BR17x are set respectively in the reference Y-direction parallax suppressed images G12x to G17x, and as shown in FIG. 25, comparison regions CR22x to CR27x are set respectively in the target Y-direction parallax suppressed images G22x to G27x.

Here, the reference regions BR12x to BR17x have the same form and size as the reference region BR11x, and the positional relation of the reference region BR11x in the reference Y-direction parallax suppressed image G11x and the positional relation of the reference regions BR12x to BR17x in the reference Y-direction parallax suppressed images G12x to G17x are the same. Also, the comparison regions CR22x to CR27x have the same form and size as the comparison region CR21x, and the positional relation of the comparison region CR21x in the target Y-direction parallax suppressed image G21x and the positional relation of the comparison regions CR22x to CR27x in the target Y-direction parallax suppressed images G22x to G27x are the same.

In this way, the first region setting block 321B sets the reference regions BR11x to BR17x including the reference point $P_{ref}1x$ respectively in the reference Y-direction parallax suppressed images G11x to G17x with the same arrangement, and also sets the comparison regions CR21x to CR27x, corresponding to the form and size of the reference regions BR11x to BR17x, respectively in the target Y-direction parallax suppressed images G21x to G27x with the same arrangement.

For the reference Y-direction parallax suppressed images G11x to G17x and the target Y-direction parallax suppressed images G21x to G27x, the first viewpoint and the second viewpoint are artificially arranged as being separated only in x direction as the result of the rectification, and so the elongate direction of the plurality of reference regions BR11x to BR17x and the plurality of comparison regions CR21x to CR27x is set in X direction corresponding to x direction.

<(2-2-5) First Pixel Value Distribution Generating Block 331B>

The first pixel value distribution generating block 331B generates one pixel value distribution (reference distribution) about two-dimensional space from the distributions of pixel values about the plurality of reference regions BR11x to BR17x, and also generates one pixel value distribution (comparison distribution) about two-dimensional space from the distributions of pixel values about the plurality of comparison regions CR21x to CR27x.

Figure 26:
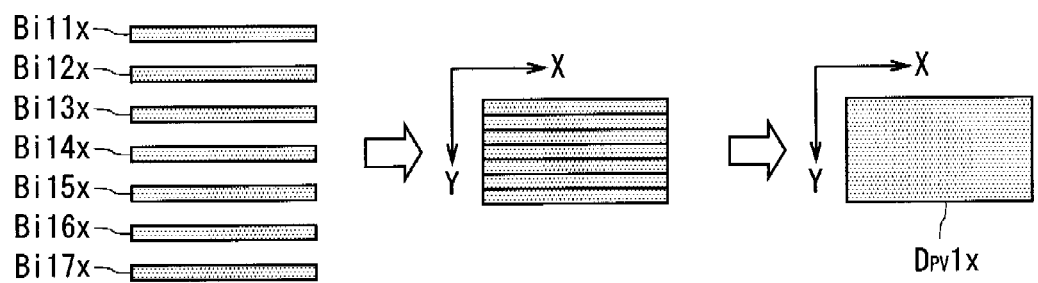
FIG. 26 is a diagram illustrating a method of generating a reference distribution in the second preferred embodiment.

Specifically, as shown in FIG. 26, first, pixel strings Bi11x to Bi17x about the reference regions BR11x to BR17x are extracted from the reference Y-direction parallax suppressed images G11x to G17x. Here, the pixel strings Bi11x to Bi17x indicate the distributions of pixel values (pixel value distributions) about the reference regions BR11x to BR17x. Specifically, the pixel value distribution Bi11x about the reference region BR11x is extracted from the reference Y-direction parallax suppressed image G11x, the pixel value distribution Bi12x about the reference region BR12x is extracted from the reference Y-direction parallax suppressed image G12x, the pixel value distribution Bi13x about the reference region BR13x is extracted from the reference Y-direction parallax suppressed image G13x, the pixel value distribution Bi14x about the reference region BR14x is extracted from the reference Y-direction parallax suppressed image G14x, the pixel value distribution Bi15x about the reference region BR15x is extracted from the reference Y-direction parallax suppressed image G15x, the pixel value distribution Bi16x about the reference region BR16x is extracted from the reference Y-direction parallax suppressed image G16x, and the pixel value distribution Bi17x about the reference region BR17x is extracted from the reference Y-direction parallax suppressed image G17x.

Next, the pixel value distributions Bi11x to Bi17x are arranged according to given arrangement rules, so as to generate a two-dimensional pixel value distribution (reference distribution) $D_{PV}1x$. The given arrangement rules are, for example, that the pixel value distributions Bi11x to Bi17x are arranged parallel to each other, and that the pixel value distribution Bi11x, pixel value distribution Bi12x, pixel value distribution Bi13x, pixel value distribution Bi14x, pixel value distribution Bi15x, pixel value distribution Bi16x, and pixel value distribution Bi17x are arranged in this order and integrated, so as to form a pixel value distribution about a rectangular region. The rectangular reference distribution $D_{PV}1x$ is thus generated.

Figure 27:
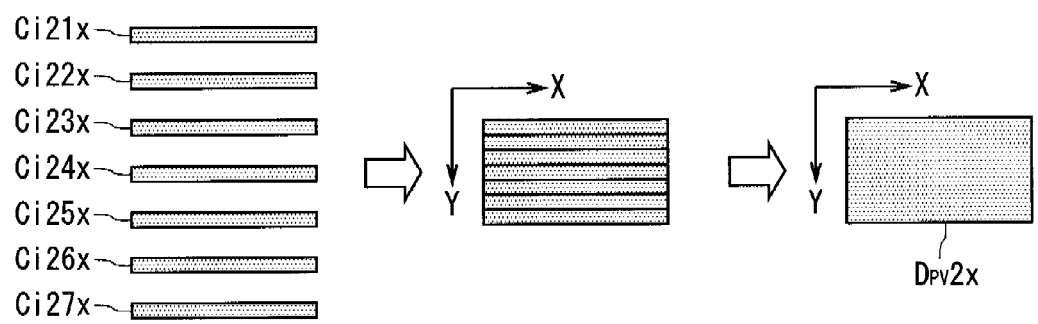
FIG. 27 is a diagram illustrating a method of generating a comparison distribution in the second preferred embodiment.

Also, as shown in FIG. 27, first, pixel strings Ci21x to Ci27x about the comparison regions CR21x to CR27x are extracted from the target Y-direction parallax suppressed images G21x to G27x. Here, the pixel strings Ci21x to Ci27x indicate the distributions of pixel values (pixel value distributions) about the comparison regions CR21x to CR27x. Specifically, the pixel value distribution Ci21x about the comparison region CR21x is extracted from the target Y-direction parallax suppressed image G21x, the pixel value distribution Ci22x about the comparison region CR22x is extracted from the target Y-direction parallax suppressed image G22x, the pixel value distribution Ci23x about the comparison region CR23x is extracted from the target Y-direction parallax suppressed image G23x, the pixel value distribution Ci24x about the comparison region CR24x is extracted from the target Y-direction parallax suppressed image G24x, the pixel value distribution Ci25x about the comparison region CR25x is extracted from the target Y-direction parallax suppressed image G25x, the pixel value distribution Ci26x about the comparison region CR26x is extracted from the target Y-direction parallax suppressed image G26x, and the pixel value distribution Ci27x about the comparison region CR27x is extracted from the target Y-direction parallax suppressed image G27x.

Next, the pixel value distributions Ci21x to Ci27x are arranged according to given arrangement rules, so as to generate a two-dimensional pixel value distribution (comparison distribution) $D_{PV}2x$. The given arrangement rules are, for example, that the pixel value distributions Ci21x to Ci27x are arranged parallel to each other, and that the pixel value distribution Ci21x, pixel value distribution Ci22x, pixel value distribution Ci23x, pixel value distribution Ci24x, pixel value distribution Ci25x, pixel value distribution Ci26x, and pixel value distribution Ci27x are arranged in this order and integrated, so as to form a pixel value distribution about a rectangular region. The rectangular comparison distribution $D_{PV}2x$ is thus generated.

In the generation of the reference distribution $D_{PV}1x$ and the comparison distribution $D_{PV}2x$, another order of arrangement may be adopted as long as the order of arrangement of the pixel value distributions Bi11x to Bi17x and the order of arrangement of the pixel value distributions Ci21x to Ci27x correspond to each other, for example.

<(2-2-6) First Matching Point Deriving Block 341B>

By using the reference distribution $D_{PV}1x$ and the comparison distribution $D_{PV}2x$, the first matching point deriving block 341B calculates a matching point corresponding to the reference point $P_{ref}1x$ in the target Y-direction parallax suppressed image G21x, and a reliability about that matching point.

Figure 28:
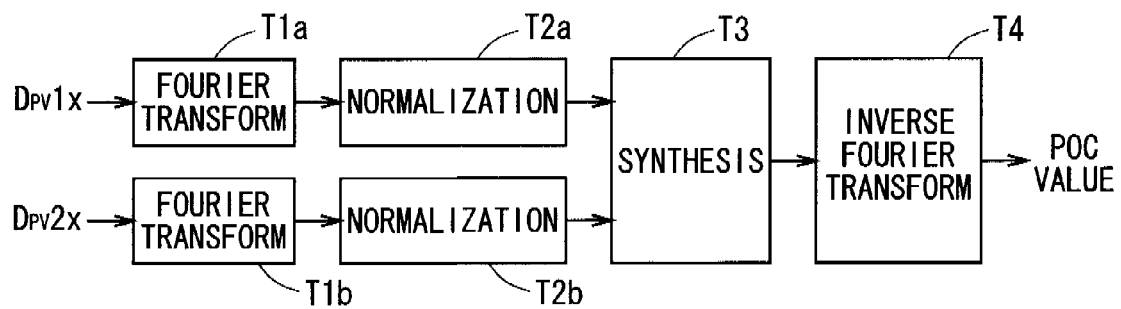
FIG. 28 is a diagram illustrating a matching point search in the second preferred embodiment.

FIG. 28 is a diagram illustrating a matching point search using phase only correlation in the first matching point deriving block 341B. In the matching point search in the first matching point deriving block 341B, as compared with the matching point search using phase only correlation of the first preferred embodiment, the combination of image regions used for the matching point search (specifically, the combination of the image region of the reference distribution $D_{PV}1$ and the image region of the comparison distribution $D_{PV}2$) is changed to a different combination of image regions (specifically, the combination of the image region of the reference distribution $D_{PV}1x$ and the image region of the comparison distribution $D_{PV}2x$).

In the matching point search in the first matching point deriving block 341B, a distribution of POC value indicating the correlation between the reference distribution $D_{PV}1x$ and the comparison distribution $D_{PV}2x$ is obtained. Then, the position corresponding to the peak of POC value in the image region of the comparison distribution $D_{PV}2x$ is derived as a matching point on the target Y-direction parallax suppressed image G21x that corresponds to the center point (reference point) $P_{ref}1x$ of the reference region BR11x on the reference Y-direction parallax suppressed image G11x.

Figure 29:
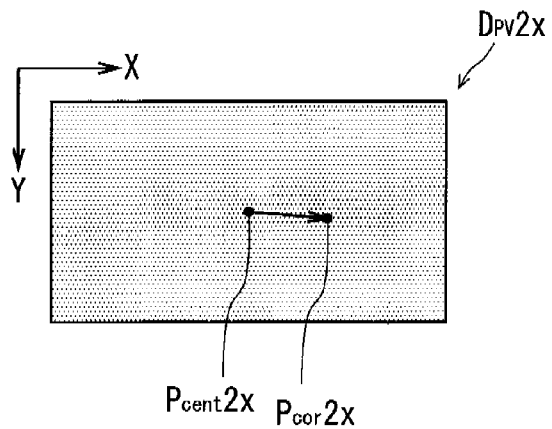
FIG. 29 is a diagram illustrating how a matching point is derived in the second preferred embodiment.

By the matching point search using phase only correlation, as shown in FIG. 29, for example, a point $P_{cor}2x$ shifted from the center point $P_{cent}2x$ of the comparison distribution $D_{PV}2x$ is detected as a point corresponding to the peak of POC value. Then, in the target Y-direction parallax suppressed images G21x to G27x, points in a positional relation like the positional relation between the center point $P_{cent}2x$ and the point $P_{cor}2x$ are derived as matching points, on the basis of the center points of the comparison regions CR21x to CR27x. Also, the peak value of POC value about the point $P_{cor}2x$ is provided as an index (reliability) indicating the reliability as a matching point.

In the description below, a matching point derived by the first matching point deriving block 341B is referred to as "a first matching point" as needed, and the reliability about the first matching point is referred to as "a first reliability" as needed. Also, the processing of searching for a matching point by the series of operations by the first region setting block 321B, the first pixel value distribution generating block 331B, and the first matching point deriving block 341B, is referred to as "first matching point search processing" as needed.

<(2-2-7) Second Region Setting Block 322B>

The second region setting block 322B includes a reference region setting block 3221B and a comparison region setting block 3222B. The reference region setting block 3221B sets reference regions as one-dimensional windows respectively in the reference X-direction parallax suppressed images G11y to G17y generated by the second rectification block 312B. The comparison region setting block 3222B sets comparison regions as one-dimensional windows respectively in the target X-direction parallax suppressed images G21y to G27y generated by the second rectification block 312B.

Figure 30:
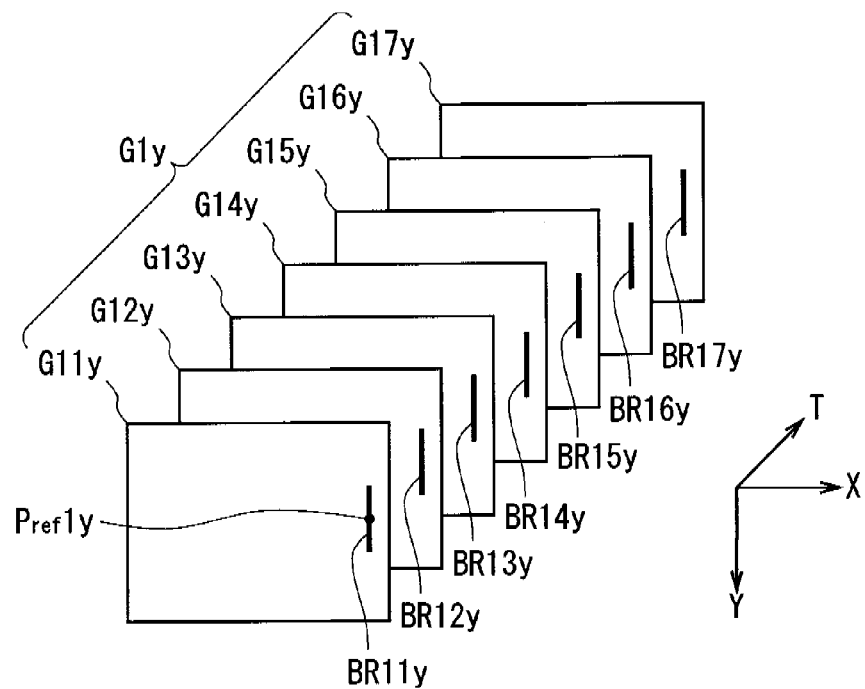
FIG. 30 is a schematic diagram illustrating how reference regions are set in the second preferred embodiment.

Specifically, as shown in FIG. 30, a one-dimensional reference region BR11y that includes a reference point $P_{ref}1y$ as a center point and that is about a pixel string along Y direction is set in the reference X-direction parallax suppressed image G11y. Also, as shown in FIG. 31, a one-dimensional comparison region CR21y about a pixel string along Y direction is set in the target X-direction parallax suppressed image G21y.

The reference region BR11y and the comparison region CR21y have a corresponding form and size (the same form and size), and the position of setting of the reference region BR11y in the reference X-direction parallax suppressed image G11y and the position of setting of the comparison region CR21y in the target X-direction parallax suppressed image G21y have a positional relation that is shifted in Y direction by an amount corresponding to the amount of shift $L_{by}$ in y direction between the optical axis of the imaging lens 21L and the optical axis of the imaging lens 22L.

In this way, the second region setting block 322B sets the reference region BR11y and the comparison region CR21y in the first image set formed of the reference X-direction parallax suppressed image G11y and the target X-direction parallax suppressed image G21y.

Figure 31:
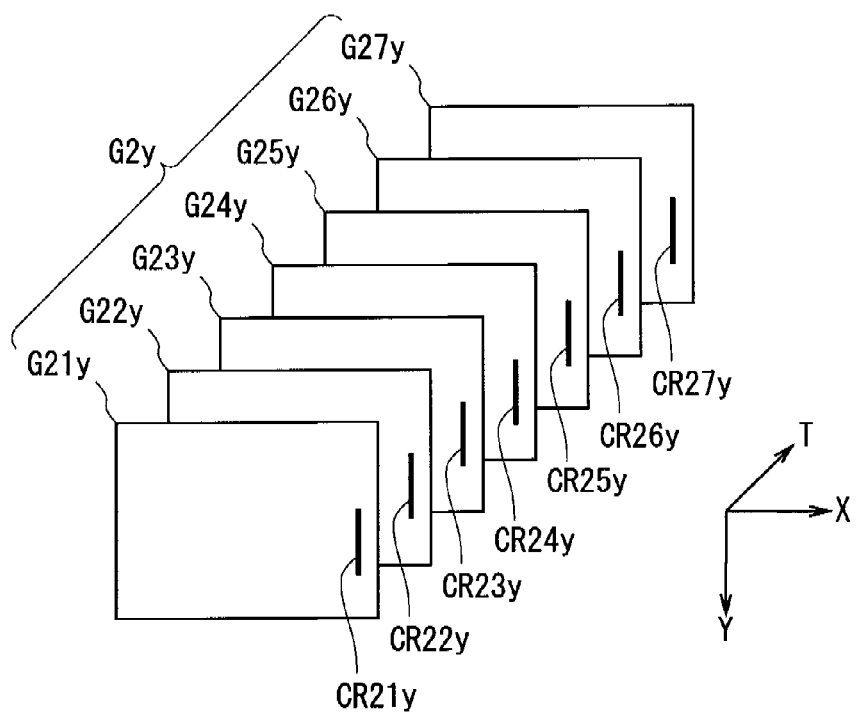
FIG. 31 is a schematic diagram illustrating how comparison regions are set in the second preferred embodiment.

Also, as shown in FIG. 30, reference regions BR12y to BR17y are set respectively in the reference X-direction parallax suppressed images G12y to G17y, and as shown in FIG. 31, comparison regions CR22y to CR27y are set respectively in the target X-direction parallax suppressed images G22y to G27y.

Here, the reference regions BR12y to BR17y have the same form and size as the reference region BR11y, and the positional relation of the reference region BR11y in the reference X-direction parallax suppressed image G11y and the positional relation of the reference regions BR12y to BR17y in the reference X-direction parallax suppressed images G12y to G17y are the same. Also, the comparison regions CR22y to CR27y have the same form and size as the comparison region CR21y, and the positional relation of the comparison region CR21y in the target X-direction parallax suppressed image G21y and the positional relation of the comparison regions CR22y to CR27y in the target X-direction parallax suppressed images G22y to G27y are the same.

In this way, the second region setting block 322B sets the reference regions BR11y to BR17y including the reference point $P_{ref}1y$ respectively in the reference X-direction parallax suppressed images G11y to G17y with the same arrangement, and also sets the comparison regions CR21y to CR27y, corresponding to the form and size of the reference regions BR11y to BR17y, respectively in the target X-direction parallax suppressed images G21y to G27y with the same arrangement.

For the reference X-direction parallax suppressed images G11y to G17y and the target X-direction parallax suppressed images G21y to G27y, the first viewpoint and the second viewpoint are artificially arranged as being separated only in y direction as the result of the rectification, and so the elongate direction of the plurality of reference regions BR11y to BR17y and the plurality of comparison regions CR21y to CR27y is set in Y direction corresponding to y direction.

<(2-2-8) Second Pixel Value Distribution Generating Block 332B>

The second pixel value distribution generating block 332B generates one pixel value distribution (reference distribution) about two-dimensional space from the distributions of pixel values about the plurality of reference regions BR11y to BR17y, and also generates one pixel value distribution (comparison distribution) about two-dimensional space from the pixel value distributions about the plurality of comparison regions CR21y to CR27y.

Figure 32:
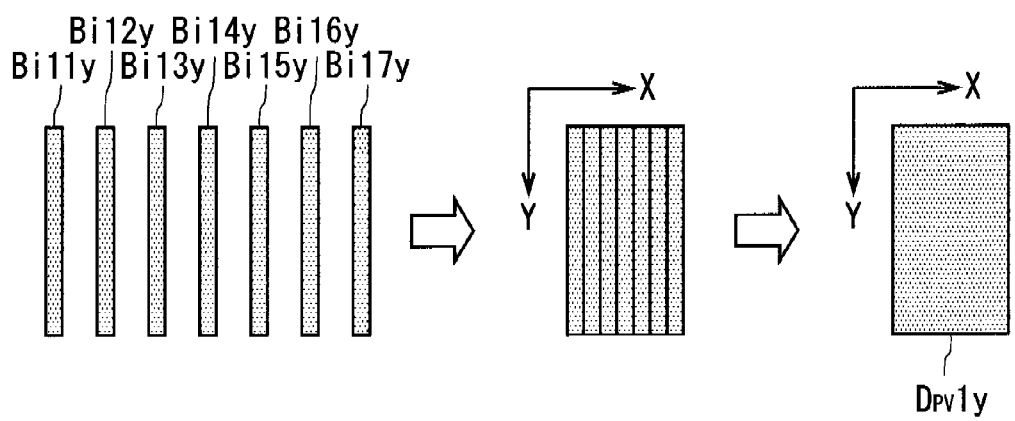
FIG. 32 is a diagram illustrating a method of generating a reference distribution in the second preferred embodiment.

Specifically, as shown in FIG. 32, first, pixel strings Bi11y to Bi17y about the reference regions BR11y to BR17y are extracted from the reference X-direction parallax suppressed images G11y to G17y. Here, the pixel strings Bi11y to Bi17y indicate the distributions of pixel values (pixel value distributions) about the reference regions BR11y to BR17y. Specifically, the pixel value distribution Bi11y about the reference region BR11y is extracted from the reference X-direction parallax suppressed image G11y, the pixel value distribution Bi12y about the reference region BR12y is extracted from the reference X-direction parallax suppressed image G12y, the pixel value distribution Bi13y about the reference region BR13y is extracted from the reference X-direction parallax suppressed image G13y, the pixel value distribution Bi14y about the reference region BR14y is extracted from the reference X-direction parallax suppressed image G14y, the pixel value distribution Bi15y about the reference region BR15y is extracted from the reference X-direction parallax suppressed image G15y, the pixel value distribution Bi16y about the reference region BR16y is extracted from the reference X-direction parallax suppressed image G16y, and the pixel value distribution Bi17y about the reference region BR17y is extracted from the reference X-direction parallax suppressed image G17y.

Next, the pixel value distributions Bi11y to Bi17y are arranged according to given arrangement rules, so as to generate a two-dimensional pixel value distribution (reference distribution) $D_{PV}1y$. The given arrangement rules are, for example, that the pixel value distributions Bi11y to Bi17y are arranged parallel to each other, and that the pixel value distribution Bi11y, pixel value distribution Bi12y, pixel value distribution Bi13y, pixel value distribution Bi14y, pixel value distribution Bi15y, pixel value distribution Bi16y, and pixel value distribution Bi17y are arranged in this order and integrated, so as to form a pixel value distribution about a rectangular region. The rectangular reference distribution $D_{PV}1y$ is thus generated.

Figure 33:
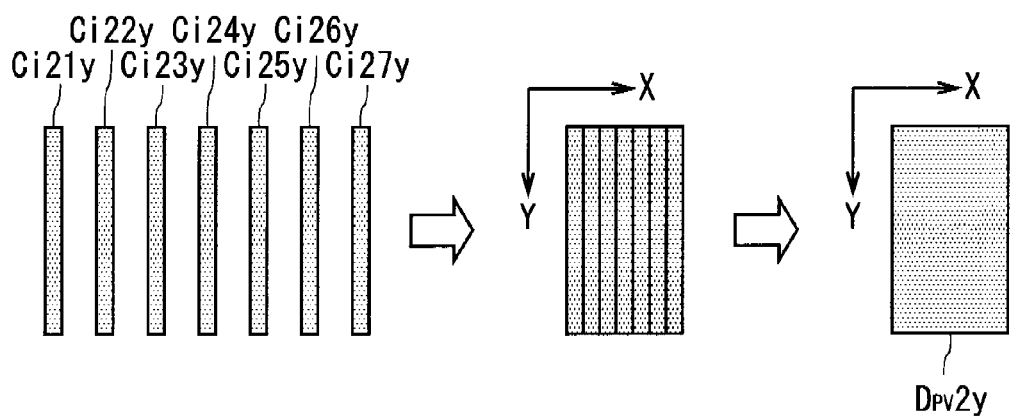
FIG. 33 is a diagram illustrating a method of generating a comparison distribution in the second preferred embodiment.

Also, as shown in FIG. 33, first, pixel strings Ci21y to Ci27y about the comparison regions CR21y to CR27y are extracted from the target X-direction parallax suppressed images G21y to G27y. Here, the pixel strings Ci21y to Ci27y indicate the distributions of pixel values (pixel value distributions) about the comparison regions CR21y to CR27y. Specifically, the pixel value distribution Ci21y about the comparison region CR21y is extracted from the target X-direction parallax suppressed image G21y, the pixel value distribution Ci22y about the comparison region CR22y is extracted from the target X-direction parallax suppressed image G22y, the pixel value distribution Ci23y about the comparison region CR23y is extracted from the target X-direction parallax suppressed image G23y, the pixel value distribution Ci24y about the comparison region CR24y is extracted from the target X-direction parallax suppressed image G24y, the pixel value distribution Ci25y about the comparison region CR25y is extracted from the target X-direction parallax suppressed image G25y, the pixel value distribution Ci26y about the comparison region CR26y is extracted from the target X-direction parallax suppressed image G26y, and the pixel value distribution Ci27y about the comparison region CR27y is extracted from the target X-direction parallax suppressed image G27y.

Next, the pixel value distributions Ci21y to Ci27y are arranged according to given arrangement rules, so as to generate a two-dimensional pixel value distribution (comparison distribution) $D_{PV}2y$. The given arrangement rules are, for example, that the pixel value distributions Ci21y to Ci27y are arranged parallel to each other, and that the pixel value distribution Ci21y, pixel value distribution Ci22y, pixel value distribution Ci23y, pixel value distribution Ci24y, pixel value distribution Ci25y, pixel value distribution Ci26y, and pixel value distribution Ci27y are arranged in this order and integrated, so as to form a pixel value distribution about a rectangular region. The rectangular comparison distribution $D_{PV}2y$ is thus generated.

In the generation of the reference distribution $D_{PV}1y$ and the comparison distribution $D_{PV}2y$, another order of arrangement may be adopted as long as the order of arrangement of the pixel value distributions Bi11y to Bi17y and the order of arrangement of the pixel value distributions Ci21y to Ci27y correspond to each other, for example.

<(2-2-9) Second Matching Point Deriving Block 342B>

By using the reference distribution $D_{PV}1y$ and the comparison distribution $D_{PV}2y$, the second matching point deriving block 342B calculates a matching point corresponding to the reference point $P_{ref}1y$ in the target X-direction parallax suppressed image G21y, and a reliability about that matching point.

FIG. 34 is a diagram illustrating a matching point search using phase only correlation in the second matching point deriving block 342B. In the matching point search in the second matching point deriving block 342B, as compared with the matching point search using phase only correlation of the first preferred embodiment, the combination of image regions used for the matching point search (specifically, the combination of the image region of the reference distribution $D_{PV}1$ and the image region of the comparison distribution $D_{PV}2$) is changed to a different combination of image regions (specifically, the combination of the image region of the reference distribution $D_{PV}1y$ and the image region of the comparison distribution $D_{PV}2y$).

In the matching point search in the second matching point deriving block 342B, a distribution of POC value indicating the correlation between the reference distribution $D_{PV}1y$ and the comparison distribution $D_{PV}2y$ is obtained. Then, the position corresponding to the peak of POC value in the image region of the comparison distribution $D_{PV}2y$ is derived as a matching point on the target X-direction parallax suppressed image G21y that corresponds to the center point (reference point) $P_{ref}1y$ of the reference region BR11y on the reference X-direction parallax suppressed image G11y.

By the matching point search using phase only correlation, as shown in FIG. 35, for example, a point $P_{cor}2y$ shifted from the center point $P_{cent}2y$ of the comparison distribution $D_{PV}2y$ is detected as a point corresponding to the peak of POC value. Then, in the target X-direction parallax suppressed images G21y to G27y, points in a positional relation like the positional relation between the center point $P_{cent}2y$ and the point $P_{cor}2y$ are derived as matching points, on the basis of the center points of the comparison regions CR21y to CR27y. Also, the peak value of POC value about the point $P_{cor}2y$ is provided as an index (reliability) indicating the reliability as a matching point.

In the description below, a matching point derived by the second matching point deriving block 342B is referred to as "a second matching point" as needed, and the reliability about the second matching point is referred to as "a second reliability" as needed. Also, the processing of searching for a matching point by the series of operations by the second region setting block 322B, the second pixel value distribution generating block 332B, and the second matching point deriving block 342B, is referred to as "second matching point search processing" as needed.

<(2-2-10) Reliability Comparing Block 343B>

The reliability comparing block 343B compares the first reliability calculated by the first matching point deriving block 341B and the second reliability calculated by the second matching point deriving block 342B and recognizes a relatively larger reliability. The combination of the first reliability and the second reliability to be compared is a combination of the first reliability about the matching point of the reference point $P_{ref}1x$ corresponding to one pixel in the reference image G11 and the second reliability about the matching point of the reference point $P_{ref}1y$ corresponding to that one pixel.

<(2-2-11) Matching Point Detecting Block 344B>

On the basis of the result of comparison in the reliability comparing block 343B, the matching point detecting block 344B adopts one of the combination of the reference point $P_{ref}1x$ and the first matching point and the combination of the reference point $P_{ref}1y$ and the second matching point. For example, when the first reliability is higher than the second reliability, the combination of the reference point $P_{ref}1x$ and the first matching point is adopted. On the other hand, when the second reliability is higher than the first reliability, the combination of the reference point $P_{ref}1y$ and the second matching point is adopted.

In the matching point detecting block 344B, when the combination of the reference point $P_{ref}1x$ and the first matching point is adopted, coordinate transformation is performed according to the expressions (11) and (12), and the relation between the reference point in the reference image group G1 and the matching point in the target image group G2 corresponding to that reference point is obtained. On the other hand, when the combination of the reference point $P_{ref}1y$ and the second matching point is adopted, coordinate transformation is performed according to the expressions (11) and (12), and the relation between the reference point in the reference image group G1 and the matching point in the target image group G2 corresponding to that reference point is obtained. Thus, matching points on the plurality of reference images G21 to G27 that correspond to the reference point on the plurality of reference images G11 to G17 are detected.

<(2-2-12) Arrangement Change Detecting Block 350B>

The arrangement change detecting block 350B detects a change of the condition of arrangement of the first camera 21 and the second camera 22 by recognizing that the relation between the position of the reference point $P_{ref}1x$ in the plurality of reference Y-direction parallax suppressed images G11x to G17x and the position of the first matching point in the plurality of target Y-direction parallax suppressed images G21x to G27x has changed in Y direction. Also, the arrangement change detecting block 350B detects a change of the condition of arrangement of the first camera 21 and the second camera 22 by recognizing that the relation between the position of the reference point $P_{ref}1y$ in the plurality of reference X-direction parallax suppressed images G11y to G17y and the position of the second matching point in the plurality of target X-direction parallax suppressed images G21y to G27y has changed in X direction. That is to say, the arrangement change detecting block 350B detects a change of the condition of arrangement about the relative arrangement of the first viewpoint and the second viewpoint.

For example, as shown in FIG. 29, in the comparison distribution $D_{PV}2x$, when the amount of shift in Y direction between the center point $P_{cent}2x$ and the point $P_{cor}2x$ has changed from a predetermined reference amount of shift (reference amount of shift), the arrangement change detecting block 350B detects a change of the condition of arrangement. Also, as shown in FIG. 35, in the comparison distribution $D_{PV}2y$, when the amount of shift in X direction between the center point $P_{cent}2y$ and the point $P_{cor}2y$ has changed from a predetermined reference amount of shift (reference amount of shift), the arrangement change detecting block 350B detects a change of the condition of arrangement.

When the arrangement change detecting block 350B detects a change of the condition of arrangement, the display 302 visually outputs a display element indicating that an adjustment operation (calibration) about the change of the condition of arrangement should be performed. The reference amount of shift in Y direction is the amount of shift in Y direction between the center point $P_{cent}2x$ and the point $P_{cor}2x$ when calibration is performed, and the reference amount of shift in X direction is the amount of shift in X direction between the center point $P_{cent}2y$ and the point $P_{cor}2y$ when calibration is performed. The reference amounts of shift in X direction and Y direction are updated and stored in the storage 304 each time calibration is performed. The method of the calibration is similar to that described in the first preferred embodiment.

<(2-2-13) Distance Calculating Block 360B>

The distance deriving block 360B derives the distance from the stereo camera 2B to the portion of the object OB that corresponds to the reference point on the basis of the combination of the coordinates of the reference point in the reference image G11 and the coordinates of the matching point in the target image G21 detected by the matching point detecting block 344B.

Specifically, the transform data $D_{trans}$ obtained by the calibration and stored in the storage 304 (specifically the projection matrices $P_1$ and $P_2$) is substituted into the expressions (1) and (2), and the coordinate values of the reference point are substituted into the expression (1) as the values of the coordinates $m_1$, and the coordinate values of the matching point corresponding to the reference point are substituted into the expression (2) as the values of the coordinates $m_2$. Then, the coordinates M of the three-dimensional point about the portion of the object OB that corresponds to the reference point are obtained as the two expressions are solved. Then, for example, when the three-dimensional coordinates of the stereo camera 2B is taken as the origin, it is easy to derive the distance from the stereo camera 2B to the portion of the object OB that corresponds to the reference point, on the basis of the obtained coordinates M.

The distance data $L_{data}$ calculated here is stored in the storage 304 in association with the coordinates M of the corresponding three-dimensional point.

In this way, the distance from the stereo camera 2B to the portion of the object OB that corresponds to the reference point is calculated on the basis of the combination of the reference point and matching point adopted in the matching point detecting block 344B (specifically, the combination of the reference point $P_{ref}1x$ and the first matching point, or the combination of the reference point $P_{ref}1y$ and the second matching point).

<(2-3) Operations of Image Processing Apparatus>

Figure 36:
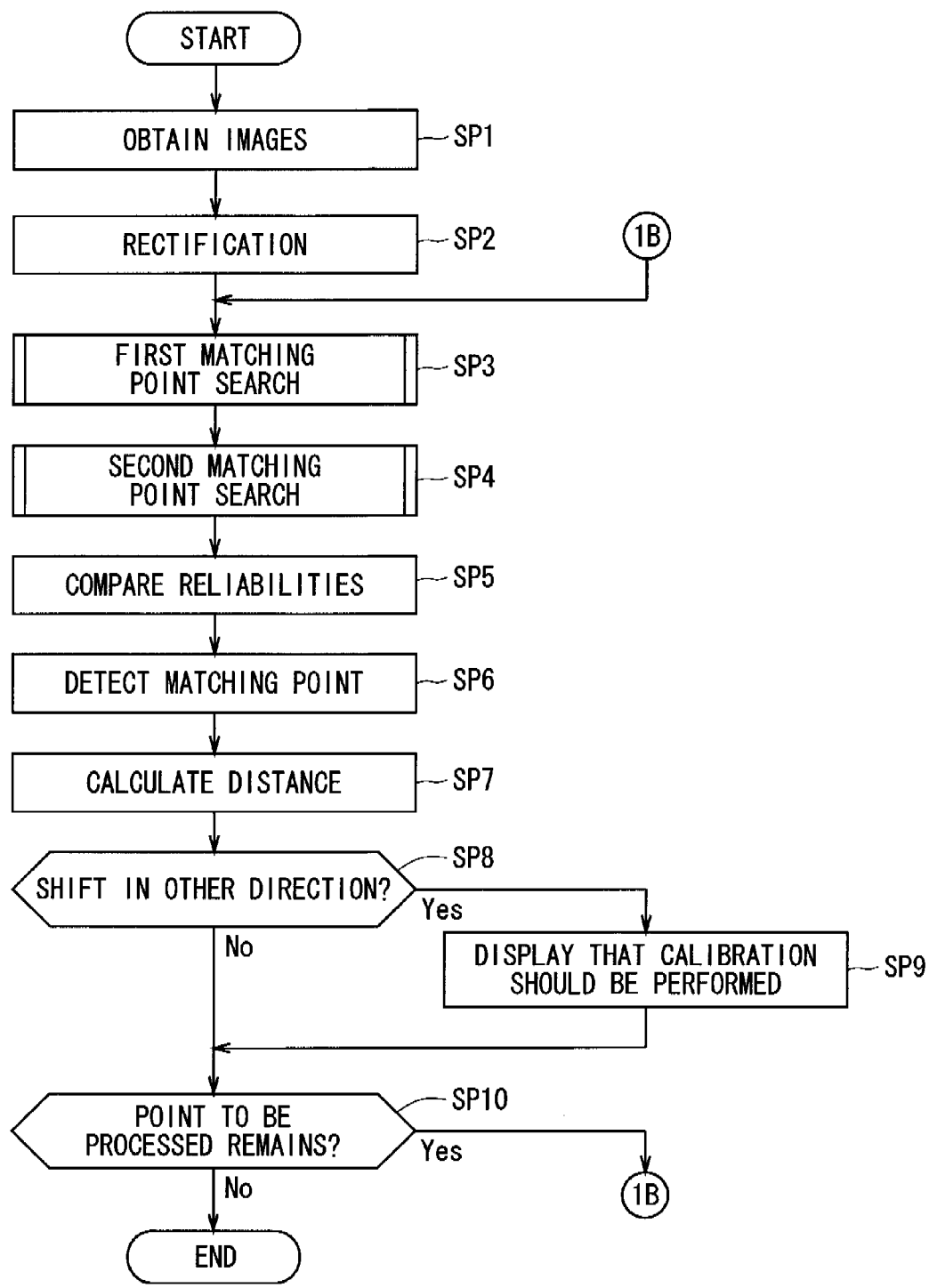
FIG. 36 is a flowchart illustrating an operation flow in the image processing apparatus of the second preferred embodiment.
Figure 37:
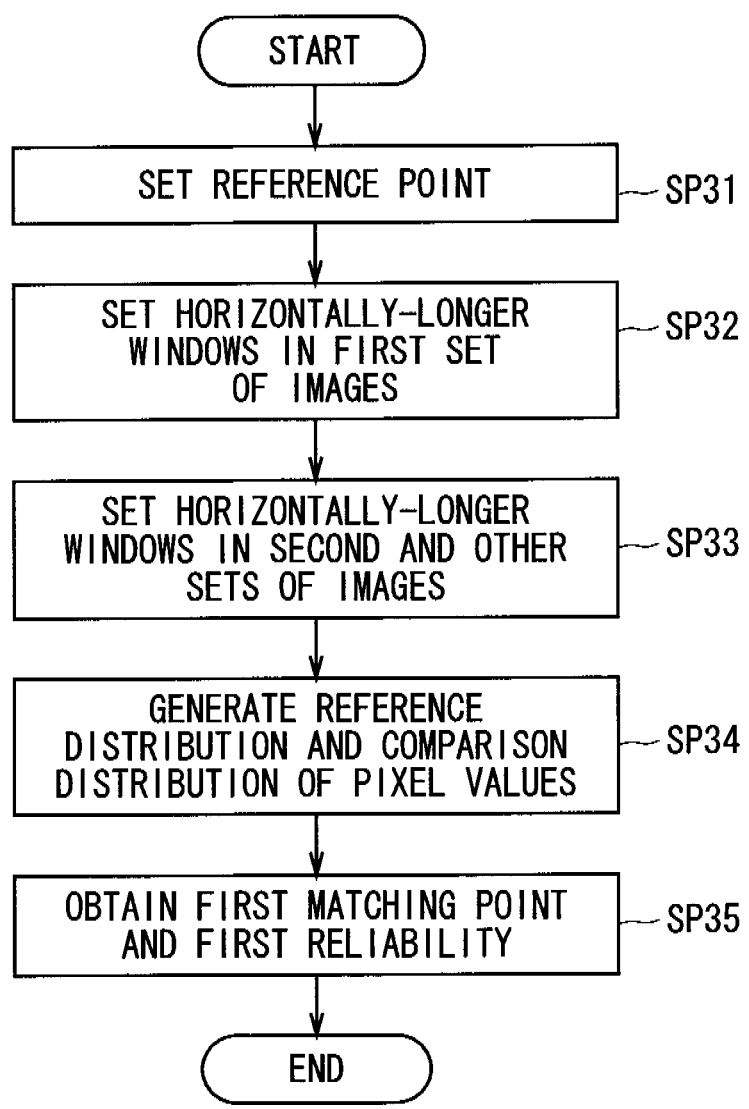
FIG. 37 is a flowchart illustrating an operation flow in the image processing apparatus of the second preferred embodiment.
Figure 38:
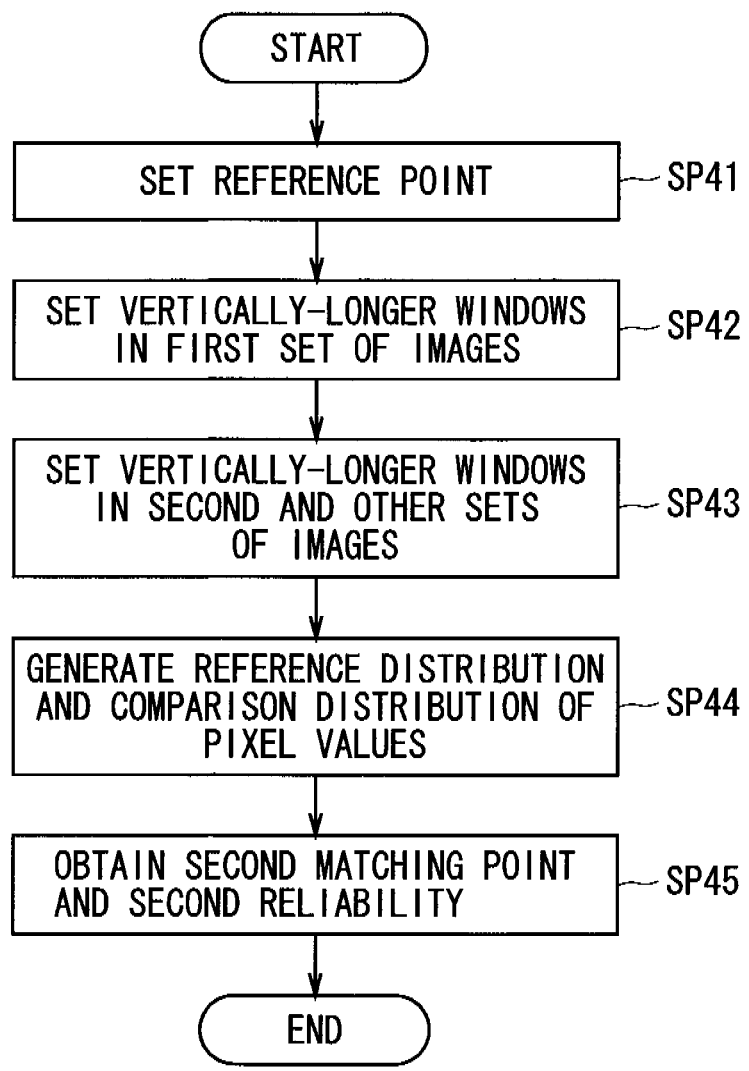
FIG. 38 is a flowchart illustrating an operation flow in the image processing apparatus of the second preferred embodiment.

FIGS. 36 to 38 are flowcharts illustrating the operation flow of the matching point search processing, the arrangement change detecting processing, and the distance measuring processing in the image processing apparatus 3B. This operation flow is implemented as the program PGb is executed in the controller 300B, and the operation flow is started as a user variously operates the operation unit 301 and the flow moves to step SP1 in FIG. 36.

In step SP1, the image obtaining block 310B obtains a reference image group G1 and a target image group G2.

In step SP2, the first and second rectification blocks 311B and 312B perform the first and second rectification operations. That is to say, a plurality of reference Y-direction parallax suppressed images G11x to G17x, a plurality of target Y-direction parallax suppressed images G21x to G27x, a plurality of reference X-direction parallax suppressed images G11y to G17y, and a plurality of target X-direction parallax suppressed images G21y to G27y are generated from the reference image group G1 and the target image group G2.

In step SP3, the first region setting block 321B, the first pixel value distribution generating block 331B, and the first matching point deriving block 341B perform the first matching point search processing. In this step SP3, the operation flow shown in FIG. 37 is performed.

In step SP31 in FIG. 37, the first region setting block 321B sets one pixel of the reference Y-direction parallax suppressed image G11x as a reference point $P_{ref}1x$.

In step SP32, the first region setting block 321B sets windows in the reference Y-direction parallax suppressed image G11x and the target Y-direction parallax suppressed image G21x that form the first image set. Here, a reference region BR11x as a one-dimensional window is set in the reference Y-direction parallax suppressed image G11x, and a comparison region CR21x as a one-dimensional window is set in the target Y-direction parallax suppressed image G21x.

In step SP33, the first region setting block 321B sets windows in the reference Y-direction parallax suppressed images G12x to G17x and the target Y-direction parallax suppressed images G21x to G27x that form the second and following image sets. Here, reference regions BR12x to BR17x, corresponding to the form, size and arrangement position of the reference region BR11x, are set in the reference Y-direction parallax suppressed images G12x to G17x, and comparison regions CR22x to CR27x, corresponding to the form, size, and arrangement position of the comparison region CR21x, are set in the target Y-direction parallax suppressed images G22x to G27x.

In step SP34, the first pixel value distribution generating block 331B generates one reference distribution $D_{PV}1x$ about two-dimensional space from the distributions of pixel values in the plurality of reference regions BR11x to BR17x, and also generates one comparison distribution $D_{PV}2x$ about two-dimensional space from the distributions of pixel values in the plurality of comparison regions CR21x to CR27x.

In step SP35, on the basis of the reference distribution $D_{PV}1x$ and the comparison distribution $D_{PV}2x$, the first matching point deriving block 341B obtains a first matching point corresponding to the reference point $P_{ref}1x$ in the target Y-direction parallax suppressed images G21x to G27x, and a first reliability about the first matching point.

In step SP4, the second region setting block 322B, the second pixel value distribution generating block 332B, and the second matching point deriving block 342B perform the second matching point search processing. In this step SP4, the operation flow shown in FIG. 38 is performed.

In step SP41 in FIG. 38, the second region setting block 322B sets one pixel in the reference X-direction parallax suppressed image G11y as a reference point $P_{ref}1y$. The reference point $P_{ref}1y$ set here is a point corresponding to the reference point $P_{ref}1x$ set in step SP31. More specifically, the reference point $P_{ref}1x$ set in step SP31 and the reference point $P_{ref}1y$ set in step SP41 are points about the same pixel of the reference image G11.

In step SP42, the second region setting block 322B sets windows in the reference X-direction parallax suppressed image G11y and the target X-direction parallax suppressed image G21y that form the first image set. Here, a reference region BR11y as a one-dimensional window is set in the reference X-direction parallax suppressed image G11y, and a comparison region CR21y as a one-dimensional window is set in the target X-direction parallax suppressed image G21y.

In step SP43, the second region setting block 322B sets windows in the reference X-direction parallax suppressed images G12y to G17y and the target X-direction parallax suppressed images G21y to G27y that form the second and following image sets. Here, reference regions BR12y to BR17y, corresponding to the form, size and arrangement position of the reference region BR11y, are set in the reference X-direction parallax suppressed images G12y to G17y, and comparison regions CR22y to CR27y, corresponding to the form, size, and arrangement position of the comparison region CR21y, are set in the target X-direction parallax suppressed images G22y to G27y.

In step SP44, the second pixel value distribution generating block 332B generates one reference distribution $D_{PV}1y$ about two-dimensional space from the distributions of pixel values in the plurality of reference regions BR11y to BR17y, and also generates one comparison distribution $D_{PV}2y$ about two-dimensional space from the distributions of pixel values in the plurality of comparison regions CR21y to CR27y.

In step SP45, on the basis of the reference distribution $D_{PV}1y$ and the comparison distribution $D_{PV}2y$, the second matching point deriving block 342B derives a second matching point corresponding to the reference point $P_{ref}1y$ in the target X-direction parallax suppressed images G21y to G27y, and a second reliability about the second matching point.

In step SP5, the reliability comparing block 343B compares the first reliability obtained in step SP3 and the second reliability obtained in step SP4 and recognizes a relatively larger reliability.

In step SP6, on the basis of the result of comparison in the reliability comparing block 343B, the matching point detecting block 344B adopts one of the combination of the reference point $P_{ref}1x$ and the first matching point and the combination of the reference point $P_{ref}1y$ and the second matching point, and the matching points on the plurality of target images G21 to G27 that correspond to the reference point on the plurality of reference images G11 to G17 are detected from the adopted combination.

In step SP7, on the basis of the coordinates of the reference point and the matching point detected in step SP6, the distance calculating block 360B calculates the three-dimensional coordinates of the portion of the object OB that corresponds to the reference point, and the distance to the portion of the object OB that corresponds to the reference point, on the basis of the stereo camera 2B. The data indicating the three-dimensional coordinates and distance calculated here is stored in the storage 304 in association with information indicating the reference point.

In step SP8, the arrangement change detecting block 350B judges whether a change of the condition of arrangement about the relative arrangement of the first viewpoint and the second viewpoint has been detected. Here, a change of the condition of arrangement of the first camera 21 and the second camera 22 is detected when the amount of shift in Y direction between the position of the reference point $P_{ref}1x$ in the plurality of reference Y-direction parallax suppressed images G11x to G17x and the position of the first matching point in the plurality of target Y-direction parallax suppressed images G21x to G27x has changed from a predetermined reference amount of shift. Also, a change of the condition of arrangement of the first camera 21 and the second camera 22 is detected when the amount of shift in X direction between the position of the reference point $P_{ref}1y$ in the plurality of reference X-direction parallax suppressed images G11y to G17y and the position of the second matching point in the plurality of target X-direction parallax suppressed images G21y to G27y has changed from a predetermined reference amount of shift. Then, when a change of the condition of arrangement is detected, the flow moves to step SP9, and when a change of the condition of arrangement is not detected, the flow moves to step SP10.

In step SP9, according to a signal output from the arrangement change detecting block 350B, the display 302 visually outputs a display element indicating that an adjustment operation (calibration) should be performed. The visual output of the display element indicating that the calibration should be performed may be continued until calibration is performed, for example. The information that calibration should be performed may be given by voice.

In step SP10, the first and second region setting blocks 321B and 322B judge whether there remains any point to be set as reference point $P_{ref}1x$ (a point to be processed) in the reference Y-direction parallax suppressed image G11x, and whether there remains any point to be set as reference point $P_{ref}1y$ (a point to be processed) in the reference X-direction parallax suppressed image G11y. For example, it is judged whether all pixels forming the reference Y-direction parallax suppressed image G11x have been set as the reference point $P_{ref}1x$. When a point to be processed remains, the flow returns to step SP3, and in step SP3, another pixel in the reference Y-direction parallax suppressed image G11x is set as reference point $P_{ref}1x$ and step SP3 is performed, and also in step SP4, another pixel in the reference X-direction parallax suppressed image G11y is set as reference point $P_{ref}1y$ and step SP4 is performed. On the other hand, when no point to be processed remains, this operation flow is ended.

According to the operation flow described above, matching points on the plurality of target images G21 to G27 are detected in correspondence with reference points on the reference images G11 to G17. The matching points may be detected about reference points at intervals of a given number of pixels on the reference image G11.

As described above, the image processing apparatus 3B of the second preferred embodiment performs a matching point search based on image regions where distant and near views coexist further less. Accordingly, the precision of the matching point search about a plurality of images taking the same object where distant and near views coexist is further improved.

<(3) Modifications>

The present invention is not limited to the above-described preferred embodiments, and various modifications and variations are possible without departing from the scope of the present invention.

<(3-1) First Modification>

In the first and second preferred embodiments, one reference distribution about two-dimensional space is generated from the distributions of pixel values about one-dimensional space in a plurality of reference regions, and one comparison distribution about two-dimensional space is generated from the distributions of pixel values about one-dimensional space in a plurality of comparison regions, but this is meant to be illustrative and not restrictive.

For example, one reference distribution about three-dimensional space may be generated from the distributions of pixel values about two-dimensional space in a plurality of reference regions, and one comparison distribution about three-dimensional space may be generated from the distributions of pixel values about two-dimensional space in a plurality of comparison regions. That is to say, the number of dimensions of the space of a reference distribution of pixel values is larger than the number of dimension(s) of the space of a plurality of reference regions, and the number of dimensions of the space of a comparison distribution of pixel values is larger than the number of dimension(s) of the space of a plurality of comparison regions.

Now, a specific example of a matching point search will be described in which the reference regions and comparison regions are two-dimensional regions where a plurality of pixels are arranged in both of X direction and Y direction, and the reference distribution of pixel values is a three-dimensional distribution of pixel values generated by layering the pixel value distributions in the plurality of reference regions according to given arrangement rules, and the comparison distribution of pixel values is a three-dimensional distribution of pixel values generated by layering the distributions of pixel values in the plurality of comparison regions according to given arrangement rules.

In an information processing system 1C of a first modification, as compared with the information processing system 1A of the first preferred embodiment, the image processing apparatus 3A is changed to an information processing apparatus 3C in which the controller 300A is replaced by a controller 300C having different functions. Specifically, as shown in FIG. 4, the region setting block 320A of the first preferred embodiment is changed to a region setting block 320C, the pixel value distribution generating block 330A of the first preferred embodiment is changed to a pixel value distribution generating block 330C, and the matching point detecting block 340A of the first preferred embodiment is changed to a matching point detecting block 340C.

In the controller 300C, a program PGc stored in a storage 304 is read and executed to implement various functions. In other respects, the configuration of the information processing system 1C of the first modification is the same as that of the information processing system 1A of the first preferred embodiment.

Accordingly, in the information processing system 1C of the first modification, the same parts as those of the information processing system 1A of the first preferred embodiment will be shown by the same reference characters and will not be described again here, and parts different from those of the information processing system 1A of the first preferred embodiment will be described.

The region setting block 320C has a reference region setting block 321C and a comparison region setting block 322C. The reference region setting block 321C sets reference regions, as two-dimensional windows, in individual reference images G11 to G17. The comparison region setting block 322C sets comparison regions, as two-dimensional windows, in individual target images G21 to G27.

Figure 39:
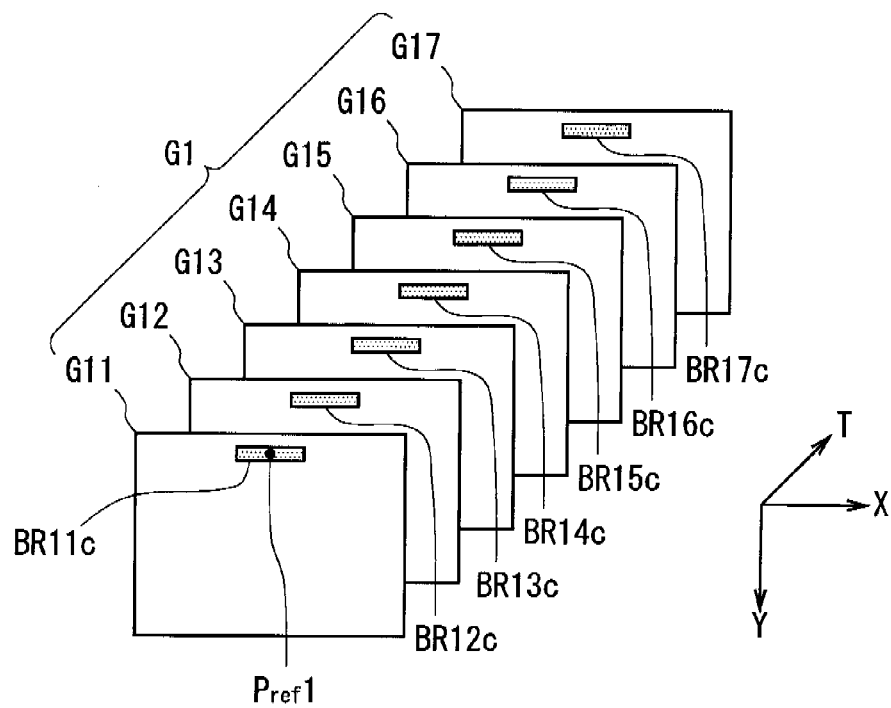
FIG. 39 is a schematic diagram illustrating how reference regions are set in the first and second modifications.
Figure 40:
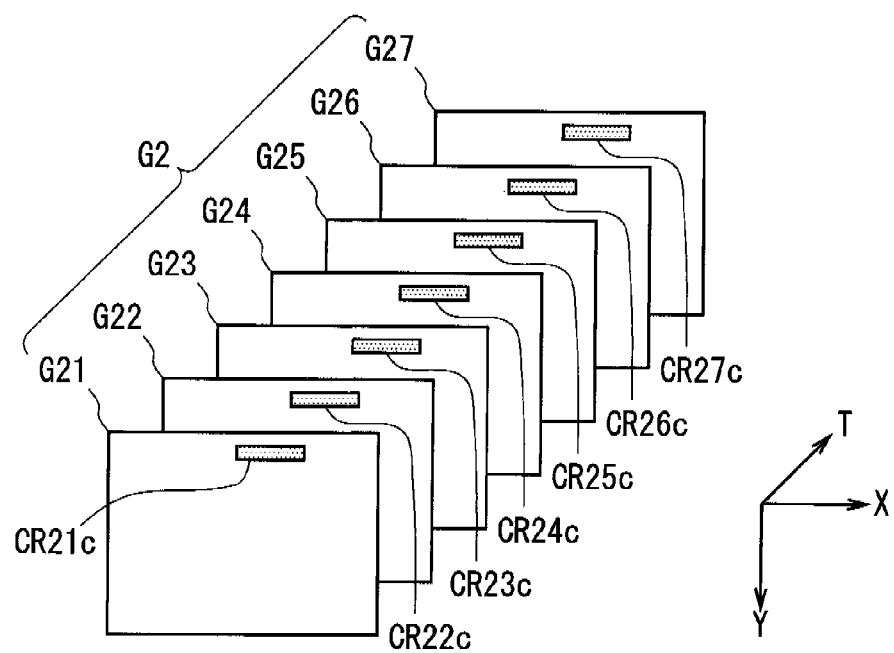
FIG. 40 is a schematic diagram illustrating how comparison regions are set in the first and second modifications.

Specifically, as shown in FIG. 39, a reference region BR11c that includes a reference point $P_{ref}1$ as a center point and that is approximately a rectangle extending in X direction is set in the reference image G11. Also, as shown in FIG. 40, a comparison region CR21c that is approximately a rectangle extending in X direction is set in the target image G21. The size in Y direction of the reference region BR11c and the comparison region CR21c can be two pixels, for example.

The reference region BR11c and the comparison region CR21c have a corresponding form and size (the same form and size), and the position where the reference region BR11c is set in the reference image G11 and the position where the comparison region CR21c is set in the target image G21 have a positional relation that is shifted in X direction by an amount corresponding to a base length $L_{ax}$.

In this way, in the first image set included in the multiple image sets, the region setting block 320C sets the reference region BR11c including the reference point $P_{ref}1$ in the reference image G11 included in the first image set, and also sets the comparison region CR21c in the target image G21.

Also, as shown in FIG. 39, reference regions BR12c to BR17c are set respectively in the reference images G12 to G17, and, as shown in FIG. 40, comparison regions CR22c to CR27c are set respectively in the target images G22 to G27.

Here, the reference regions BR12c to BR17c have the same form and size as the reference region BR11c, and the positional relation of the reference region BR11c with respect to the reference image G11, and the positional relation of the reference regions BR12c to BR17c with respect to the reference images G12 to G17, are the same. Also, the comparison regions CR22c to CR27c have the same form and size as the comparison region CR21c, and the positional relation of the comparison region CR21c with respect to the target image G21, and the positional relation of the comparison regions CR22c to CR27c with respect to the target images G22 to G27, are the same.

In this way, the region setting block 320C sets the reference regions. BR11c to BR17c including the reference point $P_{ref}1$ in the reference images G11 to G17 with the same arrangement, and also sets the comparison regions CR21c to CR27c, corresponding to the form and size of the reference regions BR11c to BR17c, in the target images G21 to G27 with the same arrangement.

Here, according to the condition of arrangement of the first viewpoint and the second viewpoint separated in x direction, the elongate direction of the multiple reference regions BR11c to BR17c and the multiple comparison regions CR21c to CR27c is set in X direction corresponding to x direction.

The pixel value distribution generating block 330C generates one pixel value distribution about three-dimensional space (reference distribution) from the distributions of pixel values about the plurality of reference regions BR11c to BR17c, and also generates one pixel value distribution about three-dimensional space (comparison distribution) from the distributions of pixel values about the plurality of comparison regions CR21c to CR27c.

Figure 41:
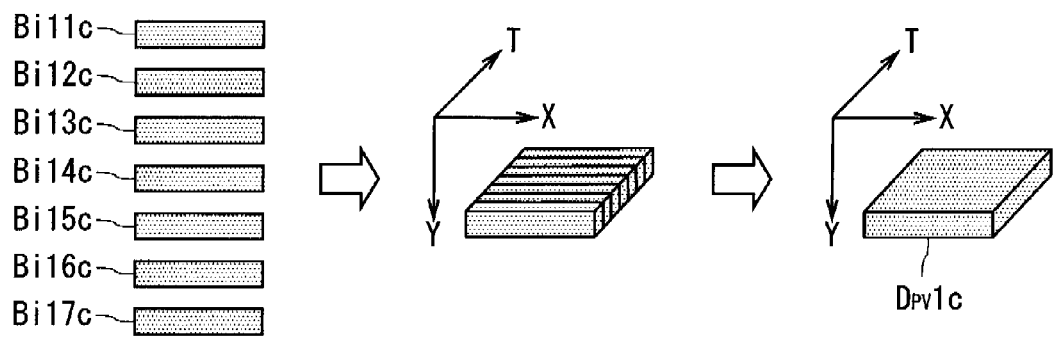
FIG. 41 is a diagram illustrating a method of generating a reference distribution in the first modification.

Specifically, as shown in FIG. 41, first, pixel value distributions Bi11c to Bi17c about the reference regions BR11c to BR17c are extracted from the reference images G11 to G17. Next, the pixel value distributions Bi11c to Bi17c are arranged according to given arrangement rules to generate a three-dimensional pixel value distribution (reference distribution) $D_{PV}1c$. Here, the given arrangement rules are, for example, that the pixel value distributions Bi11c to Bi17c are arranged parallel to each other, and that the pixel value distribution Bi11c, pixel value distribution Bi12c, pixel value distribution Bi13c, pixel value distribution Bi14c, pixel value distribution Bi15c, pixel value distribution Bi16c, and pixel value distribution Bi17c are arranged like layers in this order, so as to form a pixel value distribution about a rectangular parallelepiped region. The rectangular parallelepiped reference distribution $D_{PV}1c$ is thus generated.

Figure 42:
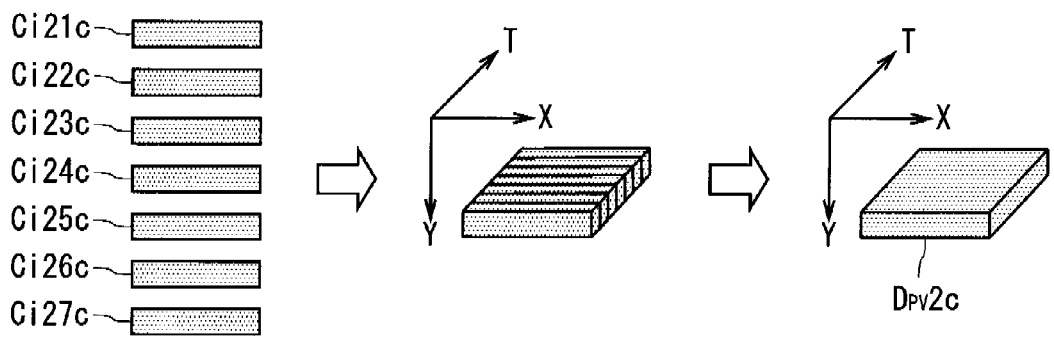
FIG. 42 is a diagram illustrating a method of generating a comparison distribution in the first modification.

Also, as shown in FIG. 42, first, pixel value distributions Ci21c to Ci27c about the comparison regions CR21c to CR27c are extracted from the target images G21 to G27. Next, the pixel value distributions Ci21c to Ci27c are arranged according to given arrangement rules to generate a three-dimensional pixel value distribution (comparison distribution) $D_{PV}2c$. Here, the given arrangement rules are, for example, that the pixel value distributions Ci21c to Ci27c are arranged parallel to each other, and that the pixel value distribution Ci21c, pixel value distribution Ci22c, pixel value distribution Ci23c, pixel value distribution Ci24c, pixel value distribution Ci25c, pixel value distribution Ci26c, and pixel value distribution Ci27c are arranged like layers in this order, so as to form a pixel value distribution about a rectangular parallelepiped region. The rectangular parallelepiped comparison distribution $D_{PV}2c$ is thus generated.

In the generation of the reference distribution $D_{PV}1c$ and the comparison distribution $D_{PV}2c$, another order of arrangement may be adopted as long as the order of arrangement of the pixel value distributions Bi11c to Bi17c and the order of arrangement of the pixel value distributions Ci21c to Ci27c correspond to each other, for example.

The matching point detecting block 340C detects a matching point corresponding to the reference point $P_{ref}1$ in the target image group G2 by using the reference distribution $D_{PV}1c$ and the comparison distribution $D_{PV}2c$.

FIG. 43 is a diagram illustrating the matching point search using phase only correlation in the matching point detecting block 340C. In the matching point search in the matching point detecting block 340C, as compared with the matching point search using phase only correlation of the first preferred embodiment, the combination of image regions used in the matching point search (specifically, the combination of the image region of the reference distribution $D_{PV}1$ and the image region of the comparison distribution $D_{PV}2$) is changed to a different combination of image regions (specifically, the combination of the image region of the reference distribution $D_{PV}1c$ and the image region of the comparison distribution $D_{PV}2c$).

In the matching point search in the matching point detecting block 340C, a distribution of POC values indicating the correlation between the reference distribution $D_{PV}1c$ and the comparison distribution $D_{PV}2c$ is obtained. Then, the position corresponding to the peak of POC value in the image region about the comparison distribution $D_{PV}2c$ is detected as a matching point on the target image G21x that corresponds to the center point (reference point) $P_{ref}1$ of the reference region BR11c on the reference image G11.

Then, by the matching point search using phase only correlation, as shown in FIG. 44, for example, a point $P_{cor}2c$ shifted from the center point $P_{cent}2c$ of the comparison distribution $D_{PV}2c$ is detected as a point corresponding to the peak of POC value. Then, in the target images G21 to G27, points in a positional relation like the positional relation between the center point $P_{cent}2c$ and the point $P_{cor}2c$ are obtained as matching points, on the basis of the center points of the comparison regions CR21c to CR27c.

The matching point search of the first preferred embodiment adopts phase only correlation about a two-dimensional region, but the matching point search of this modification adopts phase only correlation about a three-dimensional region. Now, a method of calculating POC value in the matching point search in the matching point detecting block 340C of this modification will be described.

Here, the reference distribution $D_{PV}1c$ and the comparison distribution $D_{PV}2c$ are handled as rectangular parallelepiped image regions in which a given number, $N_1$, of pixels are arranged along X direction, a given number, $N_2$, of pixels are arranged along Y direction, and a given number, $N_3$, of pixels are arranged along T direction. These image regions are represented by Expression 11 below.

$$f(n_1, n_2, n_3), \text{Size } N_1 \times N_2 \times N_3$$

$$g(n_1, n_2, n_3), \text{Size } N_1 \times N_2 \times N_3 \quad \text{Expression 11}$$

Where,
$n_1 = M_1, \ldots M_1$
$n_2 = -M_2, \ldots, M_2$
$n_3 = -M_3, \ldots, M_3$ Here, $f(n_1, n_2, n_3)$ in Expression 11 above indicates the image region about the reference distribution $D_{PV}1c$, and $g(n_1, n_2, n_3)$ in Expression 11 indicates the image region about the comparison distribution $D_{PV}2c$. Also, $N_1$, $N_2$ and $N_3$ are set as $N_1 = 2M_1+1$, $N_2 = 2M_2+1$, and $N_3 = 2M_3+1$, for example.

First, three-dimensional Fourier transforms T1$ac$ and T1$bc$ using Expression 12 below are performed to the image regions of the reference distribution $D_{PV}1c$ and the comparison distribution $D_{PV}2c$.

$$F(k_1, k_2, k_3) = \sum_{n_1, n_2, n_3} f(n_1, n_2, n_3) W_{N_1}^{k_1 n_1} W_{N_2}^{k_2 n_2} W_{N_3}^{k_3 n_3} \quad \text{Expression 12}$$

$$G(k_1, k_2, k_3) = \sum_{n_1, n_2, n_3} g(n_1, n_2, n_3) W_{N_1}^{k_1 n_1} W_{N_2}^{k_2 n_2} W_{N_3}^{k_3 n_3}$$

$$\text{Where, } W_P = \text{EXP}\left(-j\frac{2\pi}{P}\right), \quad k_s = -M_s, \ldots, M_s$$

In the note of Expression 12, $N_1$, $N_2$ and $N_3$ are assigned to the subscript P of W, and 1, 2 and 3 are assigned to the subscript s of k.

For the image regions subjected to the Fourier transforms T1$ac$ and T1$bc$, normalizations T2$ac$ and T2$bc$ are performed to remove image amplitude components by using the expressions shown as Expression 13 below.

$$F'(k_1, k_2, k_3) = \frac{F(k_1, k_2, k_3)}{|F(k_1, k_2, k_3)|}, \quad \text{Expression 13}$$

$$G'(k_1, k_2, k_3) = \frac{G(k_1, k_2, k_3)}{|G(k_1, k_2, k_3)|}$$

After normalizations T2$ac$ and T2$bc$, synthesis T3$c$ using Expression 14 below is performed, and also three-dimensional inverse Fourier transform T4$c$ using Expression 15 is performed. Correlation calculations between images are thus carried out and the results (POC value) are outputted.

$$R(k_1, k_2, k_3) = F'(k_1, k_2, k_3)\overline{G'(k_1, k_2, k_3)} \quad \text{Expression 14}$$

$$r(k_1, k_2, k_3) = \quad \text{Expression 15}$$

$$\frac{1}{N_1 N_2 N_3} \sum_{k_1, k_2, k_3} R(k_1, k_2, k_3) W_{N_1}^{-k_1 n_1} W_{N_2}^{-k_2 n_2} W_{N_3}^{-k_3 n_3}$$

As described above, in the image processing apparatus 3C of the first modification, the reference regions BR11$c$ to BR17$c$ and the comparison regions CR21$c$ to CR27$c$ are relatively small rectangular regions whose elongate direction is along X direction. Accordingly, a matching point corresponding to a reference point is less likely to be out of the comparison regions. As a result, the matching point search can be performed even when viewpoints about a plurality of images are somewhat shifted.

The method of matching point search of this modification may be applied to the first and second matching point search operations of the image processing apparatus 313 of the second preferred embodiment.

<(3-2) Second Modification>

In the first and second preferred embodiments and the first modification, the number of dimensions of the space of a reference distribution of pixel values is larger than the number of dimension(s) of the space of a plurality of reference regions, and the number of dimensions of the space of a comparison distribution of pixel values is larger than the number of dimension(s) of the space of a plurality of comparison regions, but this is meant only to be illustrative and not restrictive.

For example, with reference regions and comparison regions being two-dimensional regions, the reference distribution of pixel values may be a two-dimensional distribution of pixel values generated by arranging the distributions of pixel values of the plurality of reference regions according to given arrangement rules, and the comparison distribution of pixel values may be a two-dimensional distribution of pixel values generated by arranging the distributions of pixel values about the plurality of comparison regions according to given arrangement rules. Such a method of generating a reference distribution and a comparison distribution will be described below.

In an information processing system 1D of a second modification, the image processing apparatus 3C of the information processing system 1C of the first modification is changed to an information processing apparatus 3D in which the controller 300C is replaced by a controller 300D having different functions. Specifically, as shown in FIG. 4, the pixel value distribution generating block 330C of the first modification is changed to a pixel value distribution generating block 330D, and the matching point detecting block 340C of the first modification is changed to a matching point detecting block 340D.

In the controller 300D, a program PGd stored in a storage 304 is read and executed to implement various functions. The functions implemented by the controller 300D that are the same as those of the first modification are shown by the same reference characters and will not be described again, and the pixel value distribution generating block 330D and the matching point detecting block 340D, which are different from those of the information processing system 1C of the first modification, will be described.

The pixel value distribution generating block 330D generates one pixel value distribution about two-dimensional space (reference distribution) from the pixel value distributions about a plurality of reference regions BR11$c$ to BR17$c$, and also generates one pixel value distribution about two-dimensional space (comparison distribution) from the pixel value distributions about a plurality of comparison regions CR21c to CR27c.

Specifically, as shown in FIG. 45, pixel value distributions Bi11c to Bi17c are arranged according to given arrangement rules to generate a two-dimensional pixel value distribution (reference distribution) $D_{PV}1d$. The given arrangement rules are, for example, that the pixel value distributions Bi11c to Bi17c are arranged parallel to each other, and that the pixel value distribution Bi11c, pixel value distribution Bi12c, pixel value distribution Bi13c, pixel value distribution Bi14c, pixel value distribution Bi15c, pixel value distribution Bi16c, and pixel value distribution Bi17c are arranged in this order, so as to form a pixel value distribution about a rectangular region. The rectangular reference distribution $D_{PV}1d$ is thus generated.

Also, as shown in FIG. 46, pixel value distributions Ci21c to Ci27c are arranged according to given arrangement rules to generate a two-dimensional pixel value distribution (comparison distribution) $D_{PV}2d$. The given arrangement rules are, for example, that the pixel value distributions Ci21c to Ci27c are arranged parallel to each other, and that the pixel value distribution Ci21c, pixel value distribution Ci22c, pixel value distribution Ci23c, pixel value distribution Ci24c, pixel value distribution Ci25c, pixel value distribution Ci26c, and pixel value distribution Ci27c are arranged in this order, so as to form a pixel value distribution about a rectangular region. The rectangular comparison distribution $D_{PV}2d$ is thus generated.

As to the method of matching point search using phase only correlation in the matching point detecting block 340D, a method like that of the matching point search in the matching point detecting block 340A of the first preferred embodiment is adopted. However, the combination of image regions used in the matching point search (specifically, the combination of the image region of the reference distribution $D_{PV}1$ and the image region of the comparison distribution $D_{PV}2$) is changed to a different combination of image regions (specifically, the combination of the image region of the reference distribution $D_{PV}1d$ and the image region of the comparison distribution $D_{PV}2d$).

In the generation of the reference distribution $D_{PV}1d$ and the comparison distribution $D_{PV}2d$, another order of arrangement may be adopted as long as the order of arrangement of the pixel value distributions Bi11c to Bi17c and the order of arrangement of the pixel value distributions Ci21c to Ci27c correspond to each other, for example.

Figure 47:
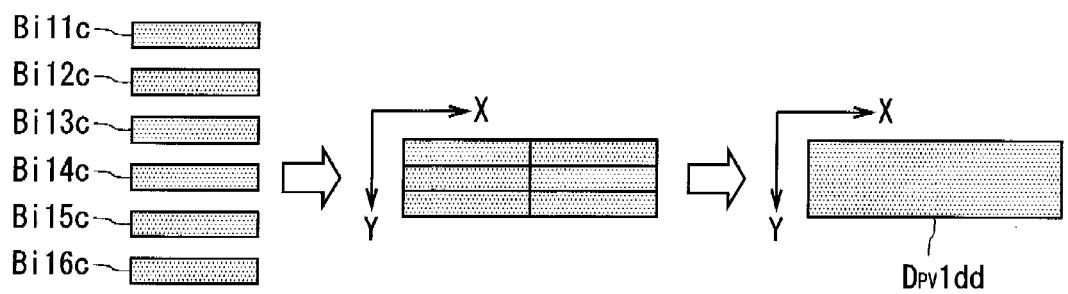
FIG. 47 is a diagram for illustrating a method of generating a reference distribution in the second modification.
Figure 48:
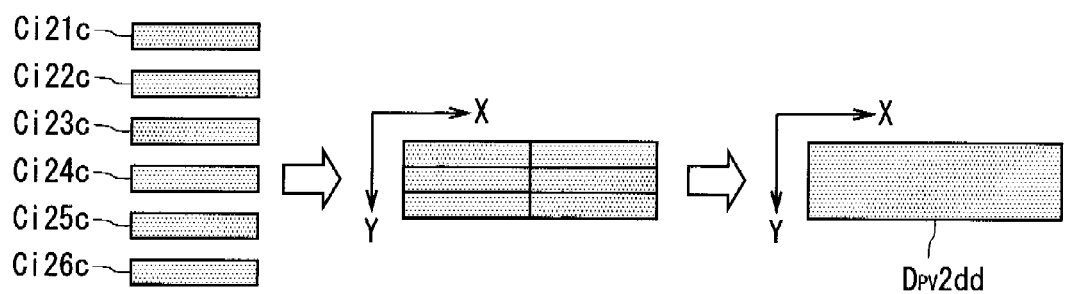
FIG. 48 is a diagram for illustrating a method of generating a comparison distribution in the second modification.

Also, while, as shown in FIG. 45, the reference distribution $D_{PV}1d$ is generated by arranging the pixel value distributions Bi11c to Bi17c in a line, and, as shown in FIG. 46, the comparison distribution $D_{PV}2d$ is generated by arranging the pixel value distributions Ci21c to Ci27c in a line, this is not restrictive. For example, as shown in FIG. 47, a reference distribution $D_{PV}1dd$ may be generated by arranging the pixel value distributions Bi11c to Bi13c in a first line and arranging the pixel value distributions Bi14c to Bi16c in a second line, and, as shown in FIG. 48, a comparison distribution $D_{PV}2dd$ may be generated by arranging the pixel value distributions Ci21c to Ci23c in a first line and the pixel value distributions Ci24c to Ci26c in a second line.

<(3-3) Third Modification>

In the first and second preferred embodiments and the first and second modifications, the object OB is intactly imaged in a time-sequential manner with the stereo camera 2A or 2B, but this is illustrative and not restrictive. For example, a projection device may be further provided to project different patterns to the object OB according to the timing of imaging by the first and second cameras 21 and 22.

Figure 49:
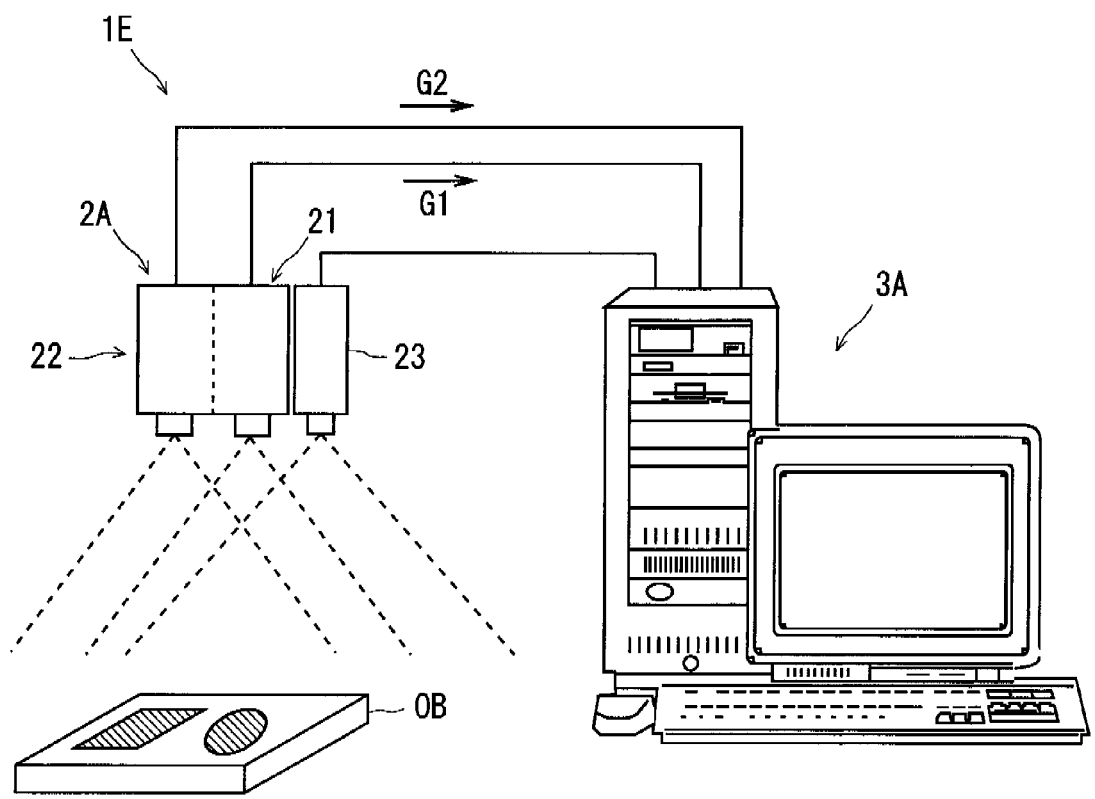
FIG. 49 is a diagram schematically illustrating the configuration of an information processing system according to a third modification.

FIG. 49 is a diagram schematically illustrating the configuration of an information processing system 1E of a third modification in which a projection device 23 is further provided in the information processing system 1A of the first preferred embodiment.

The timing of projection to the object OB by the projection device 23 is controlled by the image processing apparatus 3A. For example, in synchronization with the timing of imaging by the first and second cameras 21 and 22, the projection device 23 projects different patterns to the object OB according to individual timings of imaging. The patterns projected by the projection device 23 can be patterns in which dots are randomly arranged (random dot patterns) or noise patterns of normal distribution (Gaussian noise patterns), for example.

As described above, according to the information processing system 1E of this modification, a plurality of images are taken while time-sequentially projecting different patterns to the object, whereby the amount of information used in the calculations of the matching point search is further increased. This makes it possible to more stably and precisely perform a matching point search with a plurality of images taking the same object where distant and near views coexist.

<(3-4) Other Modifications>

In the information processing systems 1A to 1E of the first and second preferred embodiments and the first to third modifications, a matching point in the target image group G2 corresponding to a reference point in the reference image group G1 is detected in a single step of process, but this is only illustrative and not restrictive. For example, a matching point corresponding to a reference point may be detected by multiple process steps including the following steps (I) to (III).

(I) First, with a reference image group G1, reference image groups of multiple levels of resolution are generated by adopting pixel lines at given intervals, and with a target image group G2, target image groups of multiple levels of resolution are generated by adopting pixel lines at given intervals.

(II) Next, a matching point corresponding to a reference point is detected between reference and target images at low resolution.

(III) Furthermore, between reference and target images at relatively high resolution, on the basis of the reference and matching points between the low-resolution reference and target images, reference and comparison regions are set and a matching point corresponding to the reference point is detected between the reference and comparison regions.

In such a configuration, when the reference and comparison regions are somewhat extended in two-dimensional space, like the reference regions BR11c to BR17c and the comparison regions CR21c to CR27c of the second and third modifications, the matching point is less likely to be out of the comparison regions and the precision of the matching point search is less likely to deteriorate.

Also, in the information processing systems 1A to 1E of the first and second preferred embodiments and the first to third modifications, the reference regions and comparison regions are set on the basis of the perpendicular X direction and Y direction, and the reference distribution and comparison distribution are generated, but this is only illustrative and not restrictive. For example, reference regions and comparison regions may be set on the basis of X direction and a direction that intersects X direction at an acute angle, and a reference distribution and comparison distribution may be generated.

Also, in the information processing systems 1A to 1E of the first and second preferred embodiments and the first to third modifications, a matching point corresponding to a reference point is detected on the basis of a plurality of image sets each including a reference image and a target image, but this is only illustrative and not restrictive. For example, each image set may include three or more images and a matching point corresponding to a reference point may be detected among the three or more images. That is to say, each image set includes two or more images, and a matching point corresponding to a reference point is detected among the two or more images.

Needless to say, all or part of the first and second preferred embodiments, the first to third modifications, and other modifications can be used in combination as long as contradictions do not occur.

While the invention has been described in detail, the foregoing description is in all aspects illustrative and not restrictive. It is understood that numerous other modifications and variations can be devised without departing from the scope of the invention.

What is claimed is:

1. An image processing apparatus comprising:
    an image obtaining portion that obtains a plurality of first images and a plurality of second images, said plurality of first images being obtained by time-sequentially imaging an object from a first viewpoint, said plurality of second images being obtained by time-sequentially imaging said object from a second viewpoint that is different from said first viewpoint;
    a region setting portion that sets reference regions including a reference point respectively in said first images with a same arrangement, and that sets comparison regions corresponding to a form of said reference regions respectively in said second images with a same arrangement;
    a pixel value distribution generating portion that generates one reference distribution of pixel values about two-or-more-dimensional space from distributions of pixel values about the plurality of reference regions set respectively in said plurality of first images by said region setting portion, and that generates one comparison distribution of pixel values about two-or-more-dimensional space from distributions of pixel values about the plurality of comparison regions set respectively in said plurality of second images by said region setting portion; and
    a matching point detecting portion that detects a matching point in said plurality of second images that corresponds to said reference point, by using said reference distribution of pixel values and said comparison distribution of pixel values.

2. The image processing apparatus according to claim 1, wherein the number of dimensions of the space of said reference distribution of pixel values is larger than the number of dimension(s) of the space of each said reference region, and
    the number of dimensions of the space of said comparison distribution of pixel values is larger than the number of dimension(s) of the space of each said comparison region.

3. The image processing apparatus according to claim 2, wherein each said reference region and each said comparison region is a one-dimensional region about a pixel string,
    said reference distribution of pixel values is a two-dimensional distribution generated by arranging the distributions of pixel values about said plurality of reference regions according to an arrangement rule, and
    said comparison distribution of pixel values is a two-dimensional distribution generated by arranging the distributions of pixel values about said plurality of comparison regions according to said arrangement rule.

4. The image processing apparatus according to claim 2, wherein each said reference region and each said comparison region is a two-dimensional region,
    said reference distribution of pixel values is a three-dimensional distribution generated by layering the distributions of pixel values about said plurality of reference regions according to an arrangement rule, and
    said comparison distribution of pixel values is a three-dimensional distribution generated by layering the distributions of pixel values about said plurality of comparison regions according to said arrangement rule.

5. The image processing apparatus according to claim 1, wherein each said reference region and each said comparison region is a two-dimensional region,
    said reference distribution of pixel values is a two-dimensional distribution generated by arranging the distributions of pixel values about said plurality of reference regions according to an arrangement rule, and
    said comparison distribution of pixel values is a two-dimensional distribution generated by arranging the distributions of pixel values about said plurality of comparison regions according to said arrangement rule.

6. The image processing apparatus according to claim 1, wherein, according to a condition of arrangement in which said first viewpoint and said second viewpoint are separated in at least one direction, said region setting portion sets said plurality of reference regions and said plurality of comparison regions such that an elongate direction of said plurality of reference regions and said plurality of comparison regions corresponds to that one direction, and
    said image processing apparatus further comprises a detector that detects a change of said condition of arrangement when a relation between a position of said reference point in said plurality of first images and a position of said matching point in said plurality of second images detected by said matching point detecting portion has changed in a direction different from said one direction.

7. The image processing apparatus according to claim 1, further comprising a distance calculating portion that calculates a distance from an imaging device that takes said plurality of first images and said plurality of second images to a portion of said object that corresponds to said reference point, on the basis of said reference point and said matching point detected by said matching point detecting portion.

8. An information processing system comprising:
    the image processing apparatus according to claim 1;
    an imaging device having a first camera and a second camera, wherein said first camera and said second camera time-sequentially take images with same timing, so that said first camera time-sequentially takes said plurality of first images and said second camera time-sequentially takes said plurality of second images; and
    a projection device that projects different patterns to said object according to each timing of imaging by said first camera and said second camera.

9. An image processing apparatus comprising:
    an image obtaining portion that obtains a plurality of first images and a plurality of second images, said plurality of first images being obtained by time-sequentially imaging an object from a first viewpoint, said plurality of second images being obtained by time-sequentially imaging said object from a second viewpoint that is shifted from said first viewpoint in both of a first direction and a second direction;

a first image generating portion that generates a plurality of first parallax suppressed images by suppressing parallax about said second direction occurring in each said first image, and that generates a plurality of second parallax suppressed images by suppressing parallax about said second direction occurring in each said second image;

a second image generating portion that generates a plurality of third parallax suppressed images by suppressing parallax about said first direction occurring in each said first image, and that generates a plurality of fourth parallax suppressed images by suppressing parallax about said first direction occurring in each said second image;

a first region setting portion that sets first reference regions that include a first reference point and that have an elongate direction corresponding to said first direction respectively in said first parallax suppressed images with a same arrangement, and also sets first comparison regions corresponding to a form of said first reference regions respectively in said second parallax suppressed images with a same arrangement;

a second region setting portion that sets second reference regions that include a second reference point corresponding to said first reference point and that have an elongate direction corresponding to said second direction respectively in said third parallax suppressed images with a same arrangement, and also sets second comparison regions corresponding to a form of said second reference regions respectively in said fourth parallax suppressed images with a same arrangement;

a first pixel value distribution generating portion that generates one first reference distribution of pixel values about two-or-more-dimensional space from distributions of pixel values about the plurality of first reference regions that are set respectively in said plurality of first parallax suppressed images by said first region setting portion, and also generates one first comparison distribution of pixel values about two-or-more-dimensional space from distributions of pixel values about the plurality of first comparison regions that are set respectively in said plurality of second parallax suppressed images by said first region setting portion;

a second pixel value distribution generating portion that generates one second reference distribution of pixel values about two-or-more-dimensional space from distributions of pixel values about the plurality of second reference regions that are set respectively in said plurality of third parallax suppressed images by said second region setting portion, and also generates one second comparison distribution of pixel values about two-or-more-dimensional space from distributions of pixel values about the plurality of second comparison regions that are set respectively in said plurality of fourth parallax suppressed images by said second region setting portion;

a first obtaining portion that, by using said first reference distribution of pixel values and said first comparison distribution of pixel values, obtains a first matching point in said plurality of second parallax suppressed images that corresponds to said first reference point, and a first reliability about said first matching point;

a second obtaining portion that, by using said second reference distribution of pixel values and said second comparison distribution of pixel values, obtains a second matching point in said plurality of fourth parallax suppressed images that corresponds to said second reference point, and a second reliability about said second matching point; and a matching point detecting portion that, with a first combination of said first reference point and said first matching point and a second combination of said second reference point and said second matching point, adopts said first combination when said first reliability is higher than said second reliability, and adopts said second combination when said second reliability is higher than said first reliability.

10. The image processing apparatus according to claim 9, further comprising a distance calculating portion that calculates a distance from an imaging device that takes said plurality of first images and said plurality of second images to a portion of said object that corresponds to said first reference point, on the basis of said first combination or said second combination that is adopted by said matching point detecting portion.

11. An information processing system comprising:
the image processing apparatus according to claim 9;
an imaging device having a first camera and a second camera, wherein said first camera and said second camera time-sequentially take images with same timing, so that said first camera time-sequentially takes said plurality of first images and said second camera time-sequentially takes said plurality of second images; and
a projection device that projects different patterns to said object according to each timing of imaging by said first camera and said second camera.

12. An image processing method comprising the steps of:
(a) obtaining a plurality of first images, said plurality of first images being obtained by time-sequentially imaging an object from a first viewpoint;
(b) obtaining a plurality of second images, said plurality of second images being obtained by time-sequentially imaging said object from a second viewpoint different from said first viewpoint;
(c) setting reference regions including a reference point respectively in said first images with a same arrangement;
(d) setting comparison regions corresponding to a form of said reference regions respectively in said second images with a same arrangement;
(e) generating one reference distribution of pixel values about two-or-more-dimensional space from distributions of pixel values about the plurality of reference regions set respectively in said plurality of first images in said step (c);
(f) generating one comparison distribution of pixel values about two-or-more-dimensional space from distributions of pixel values about the plurality of comparison regions set respectively in said plurality of second images in said step (d); and
(g) detecting a matching point in said plurality of second images that corresponds to said reference point, by using said reference distribution of pixel values and said comparison distribution of pixel values.

13. An image processing method comprising the steps of:
(h) obtaining a plurality of first images, said plurality of first images being obtained by time-sequentially imaging an object from a first viewpoint;
(i) obtaining a plurality of second images, said plurality of second images being obtained by time-sequentially imaging said object from a second viewpoint that is shifted from said first viewpoint in both of a first direction and a second direction;
(j) generating a plurality of first parallax suppressed images by suppressing parallax about said second direction occurring in each said first image;

(k) generating a plurality of second parallax suppressed images by suppressing parallax about said second direction occurring in each said second image;
(l) generating a plurality of third parallax suppressed images by suppressing parallax about said first direction occurring in each said first image;
(m) generating a plurality of fourth parallax suppressed images by suppressing parallax about said first direction occurring in each said second image;
(n) setting first reference regions that include a first reference point and that have an elongate direction corresponding to said first direction respectively in said first parallax suppressed images with a same arrangement;
(o) setting first comparison regions corresponding to a form of said first reference regions respectively in said second parallax suppressed images with a same arrangement;
(p) setting second reference regions that include a second reference point corresponding to said first reference point and that have an elongate direction corresponding to said second direction respectively in said third parallax suppressed images with a same arrangement;
(q) setting second comparison regions corresponding to a form of said second reference regions respectively in said fourth parallax suppressed images with a same arrangement;
(r) generating one first reference distribution of pixel values about two-or-more-dimensional space from distributions of pixel values about the plurality of first reference regions that are set respectively in said plurality of first parallax suppressed images in said step (n);
(s) generating one first comparison distribution of pixel values about two-or-more-dimensional space from distributions of pixel values about the plurality of first comparison regions that are set respectively in said plurality of second parallax suppressed images in said step (o);
(t) generating one second reference distribution of pixel values about two-or-more-dimensional space from distributions of pixel values about the plurality of second reference regions that are set respectively in said plurality of third parallax suppressed images in said step (p);
(u) generating one second comparison distribution of pixel values about two-or-more-dimensional space from distributions of pixel values about the plurality of second comparison regions that are set respectively in said plurality of fourth parallax suppressed images in said step (q);
(v) by using said first reference distribution of pixel values and said first comparison distribution of pixel values, obtaining a first matching point in said plurality of second parallax suppressed images that corresponds to said first reference point, and a first reliability about said first matching point;
(w) by using said second reference distribution of pixel values and said second comparison distribution of pixel values, obtaining a second matching point in said plurality of fourth parallax suppressed images that corresponds to said second reference point, and a second reliability about said second matching point; and
(x) with a first combination of said first reference point and said first matching point and a second combination of said second reference point and said second matching point, adopting said first combination when said first reliability is higher than said second reliability, and adopting said second combination when said second reliability is higher than said first reliability.

\* \* \* \* \*